SOLID STATE ELECTRON EMISSIVE MEMORY AND DISPLAY APPARATUS AND METHOD

Filed June 22, 1964 8 Sheets-Sheet 1

VERTICAL SENSITIVITY-2mA/DIV.
HORIZONTAL SENSITIVITY-1V/DIV.

VERTICAL SENSITIVITY-2mA/DIV.
HORIZONTAL SENSITIVITY-1V/DIV.
CURVE (a) 6V/0.15 SEC. FALL
CURVE (b) 6V/0.3 SEC. RISE

INVENTORS.
RUDOLPH A. COLA
RUDOLPH R. VERDERBER
JOHN G. SIMMONS
ROBERT A. TRACY
Carl Fissell Jr
AGENT

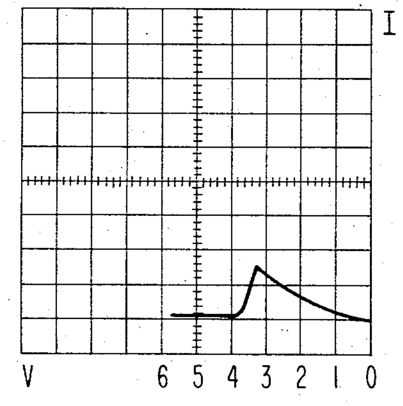

VERTICAL SENSITIVITY–2 mA/DIV.
HORIZONTAL SENSITIVITY–1V/DIV.
VOLTAGE RATE OF FALL–6V/25 mSEC.

Fig. 5

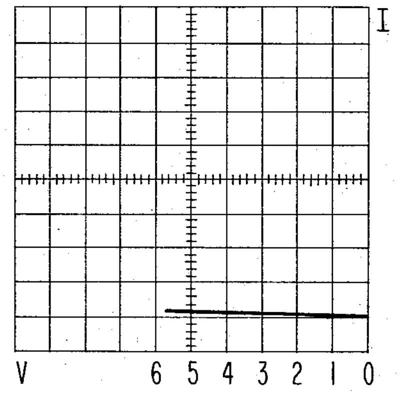

VERTICAL SENSITIVITY–2 mA/DIV.
HORIZONTAL SENSITIVITY–1V/DIV.
VOLTAGE RATE OF FALL–6V/10 mSEC.

Fig. 6

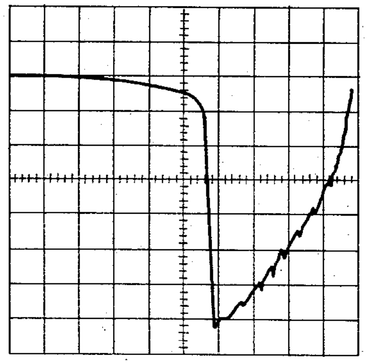

VERTICAL SENSITIVITY–0.2μA/DIV.
HORIZONTAL SENSITIVITY–10 mSEC./DIV.

Fig. 8

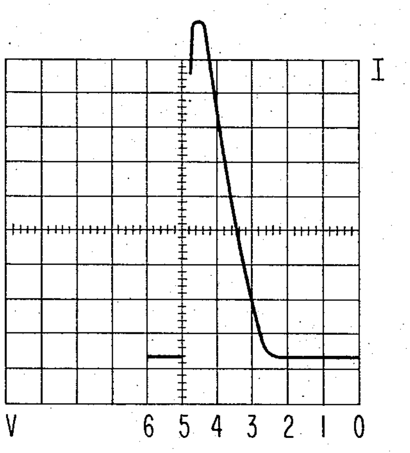

VERTICAL SENSITIVITY–2 mA/DIV.
HORIZONTAL SENSITIVITY–1V/DIV.
VOLTAGE RATE OF RISE–6V/0.4 SEC.

Fig. 7

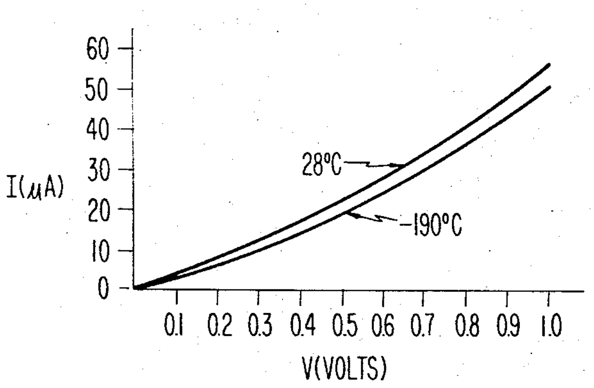

Fig. 9

INVENTORS.
RUDOLPH A. COLA
RUDOLPH R. VERDERBER
JOHN G. SIMMONS
ROBERT A. TRACY
Carl Fissell Jr.
AGENT INVENTORS.
RUDOLPH A. COLA
RUDOLPH R. VERDERBER
JOHN G. SIMMONS
ROBERT A. TRACY
Carl Fissell Jr.
AGENT INVENTORS.
RUDOLPH A. COLA
RUDOLPH R. VERDERBER
JOHN G. SIMMONS
ROBERT A. TRACY
Carl Fissell Jr.
AGENT INVENTORS.
RUDOLPH A. COLA
RUDOLPH R. VERDERBER
JOHN G. SIMMONS
ROBERT A. TRACY
Carl Fissell Jr.
AGENT INVENTORS.
RUDOLPH A. COLA
RUDOLPH R. VERDERBER
JOHN G. SIMMONS
ROBERT A. TRACY
Carl Fissell Jr.
AGENT INVENTORS.
RUDOLPH A. COLA
RUDOLPH R. VERDERBER
JOHN G. SIMMONS
ROBERT A. TRACY
Carl Fissell Jr.
AGENT INVENTORS.
RUDOLPH A. COLA
RUDOLPH R. VERDERBER
JOHN G. SIMMONS
ROBERT A. TRACY
Carl Fissell Jr.
AGENT United States Patent Office 3,363,240

Patented Jan. 9, 1968

3,363,240
SOLID STATE ELECTRON EMISSIVE MEMORY AND DISPLAY APPARATUS AND METHOD

Rudolph A. Cola, Philadelphia, Rudolph R. Verderber, West Chester, John G. Simmons, Norristown, and Robert A. Tracy, West Chester, Pa., assignors to Burroughs Corporation, Detroit, Mich., a corporation of Michigan Filed June 22, 1964, Ser. No. 376,821
19 Claims. (Cl. 340—173)

ABSTRACT OF THE DISCLOSURE

This invention relates to solid state metal-insulator-metal electron emissive multilayer memory storage apparatus wherein during the fabrication thereof the gradual cycling of the device from 0 to 6 volts D.C. and back to 0 volts at a pressure ≤15 microns of mercury induces the formation of quantum mechanical traps in the isolation layer of the device resulting in the exhibition of negative resistance. Quantum electron tunneling in the present apparatus is from trap to trap. The apparatus has the inherent ability to "remember" its stored impedance in the unpowered state under certain voltage/time conditions effective to provide a memory element and/or a memory matrix of such elements.

The present invention relates to solid state electron emissive memory and display apparatus and method and, more particularly, although not necessarily exclusively, to negative resistance and electron emission in tin metal-insulator-metal multi-layer structures. With still more specificity, the invention relates to vacuum deposited thin film devices or structures comprising metal, metal oxide, metal halogen and metal e.g. aluminum, aluminum oxide, magnesium fluoride and gold in layers and wherein the apparatus demonstrates a negative resistance characteristic and emits electrons.

The characteristics of the present apparatus demonstrate that it may be utilized as a switch, as a memory and/or as a display device. In addition the operational explanation, as presented hereinafter, describes a new conduction mechanism based on tunnelling through traps. This model explains the observed behavior of the present metal-insulator-metal structure.

It is an object of the present invention to provide a solid state electron emissive memory and display apparatus.

Another object of the invention is to provide solid state apparatus having negative resistance and electron emission capabilities.

Still a further object of the invention is to provide a static and/or dynamic visual display apparatus capable of continuous information storage.

Still another object of the invention is to provide a high density memory matrix including a plurality of metal-insulator-metal devices utilizing coincident voltage techniques wherein there are no half selected devices thus greatly reducing generated noise.

It is also an object of the invention to provide a resistor-coupled threshold logic circuit utilizing the metal-insulator-metal apparatus.

Another object of the invention is to provide a solid state thin film trigger source for cold cathode electron devices.

An object of the invention is to provide a solid state thin film asymmetric memory device eliminating the requirement for isolation means when reverse biased.

In accordance with the foregoing objects and first briefly described, the present invention comprises a metal-insulator-metal layered sandwich type structure having a relatively thick insulator on the order of from 100 to 2,000 angstroms, in which the layers include aluminum, aluminum oxide, a metal halogen compound, e.g. magnesium fluoride and gold and wherein application of suitable potentials to the metallic conductors of the device cause the emission of electrons and negative resistance characteristics to be observed. The apparatus is operable as a switching device, as a memory storage device, as a visual display apparatus and as a cold cathode emissive device. The structure relies for its behaviour characteristics on a conduction mechanism in which electrons are considered to tunnel through traps formed in the insulating materials comprising the device.

Further objects and advantages of the present invention will become readily apparent as the following detailed description unfolds and when taken in conjunction with the appended claims and accompanying drawings, wherein:

FIGS. 1*a* through 1*e* illustrate the step by step formation of the apparatus embodying the present invention;

FIG. 5 is an illustration of an oscilloscope trace of the partial deterioration of negative resistance due to a sudden decrease in voltage;

FIG. 6 is a view similar to FIG. 5 but illustrating complete deterioration of negative resistance;

FIG. 7 is an oscilloscope trace illustrating the initial current response to increasing voltage after decreasing the voltage in a short time;

FIG. 8 is an oscilloscope trace of the response of electron emission to a 50 msec. pulse;

FIG. 9 is a graph of curves illustrating the temperature dependence of the low impedance portion of the device;

Figure 14B:
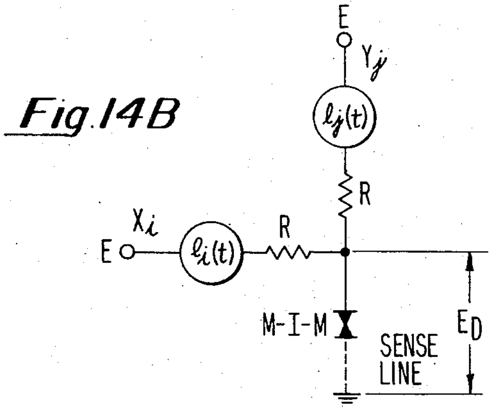
Figure 14A:
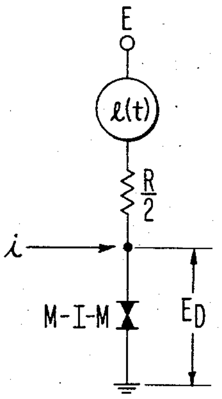
Figure 15:
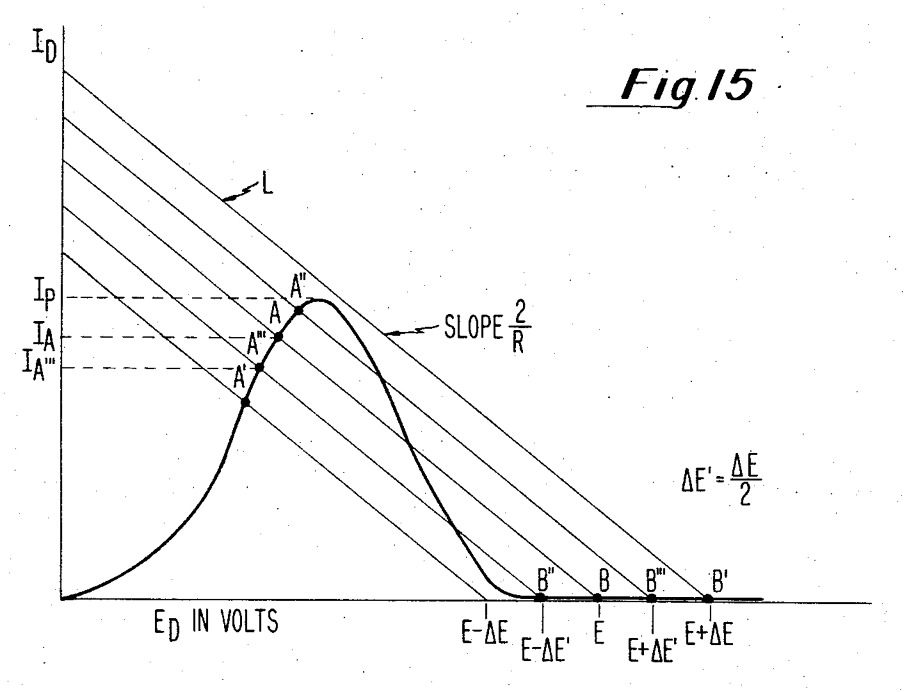
Figure 16:
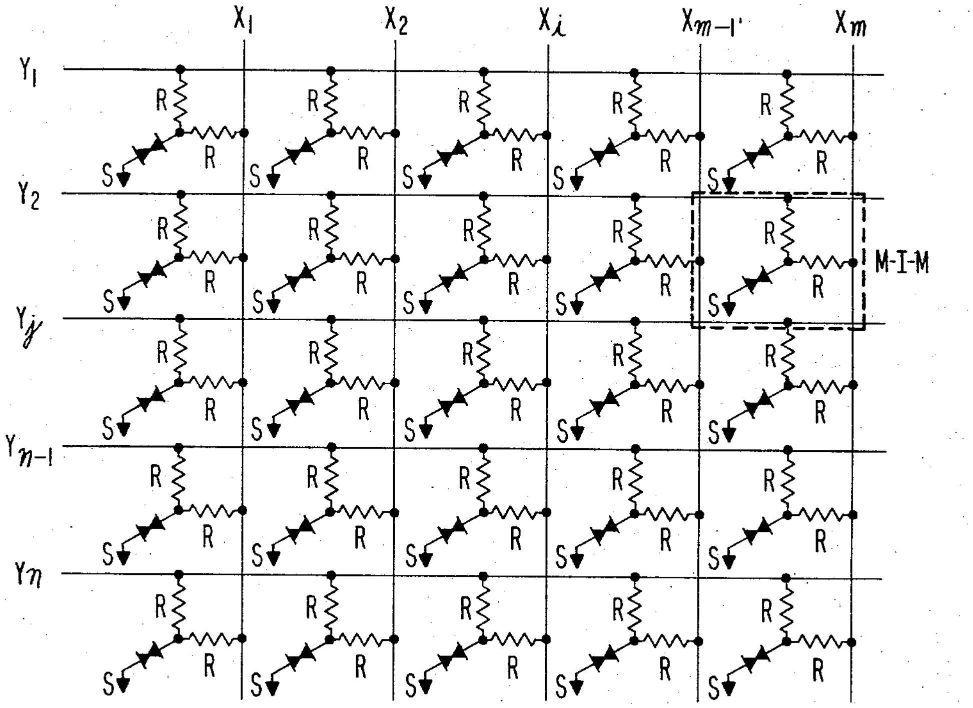
Figure 17:
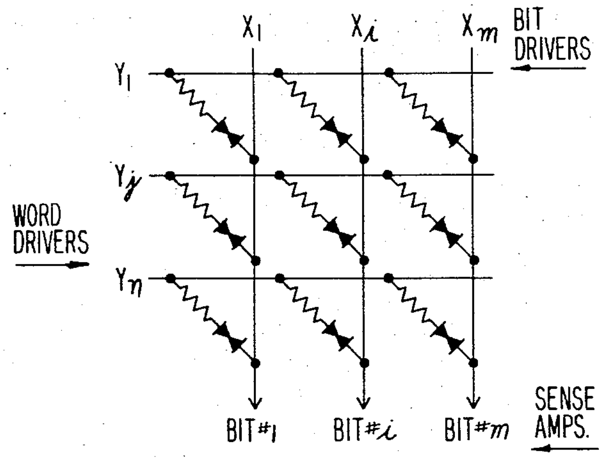
Figure 18:
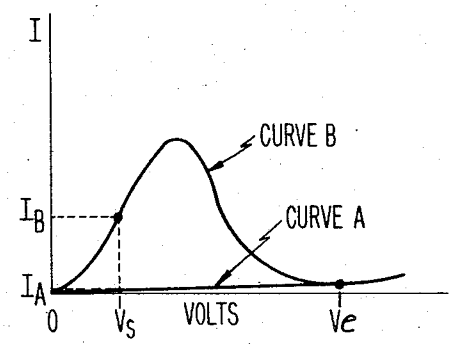
Figure 19:
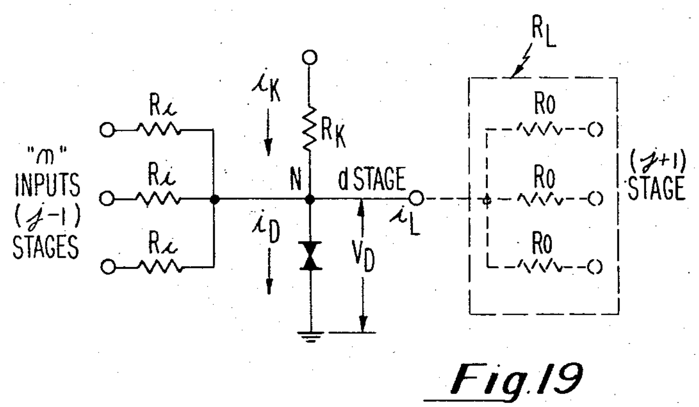
Figure 20:
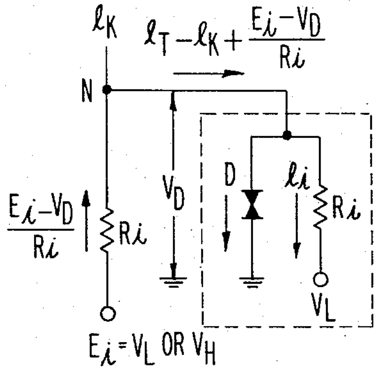
Figure 21:
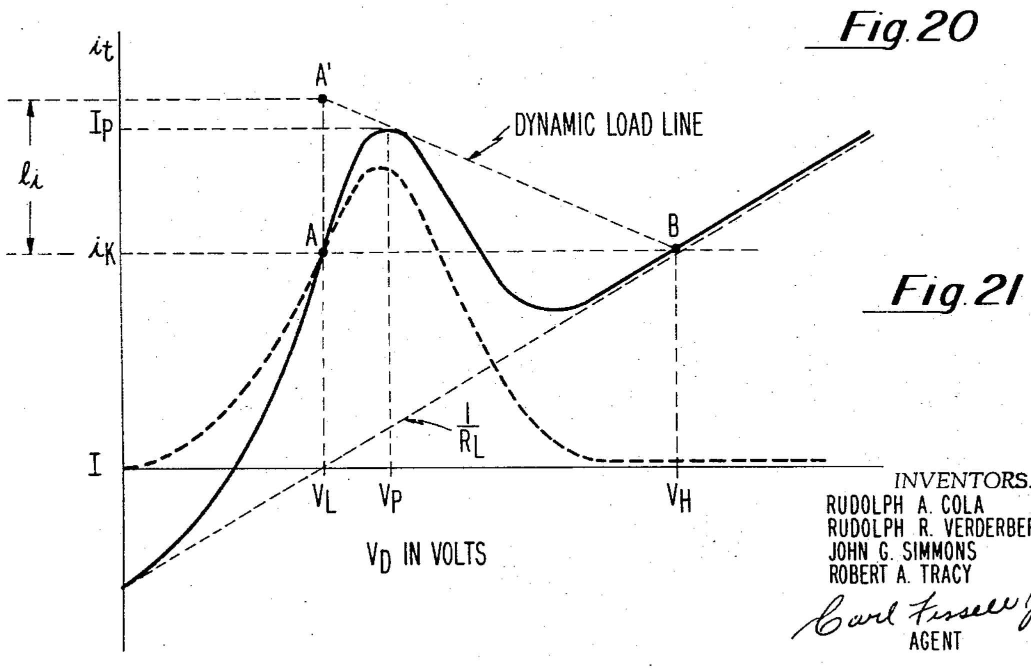
Figure 22:
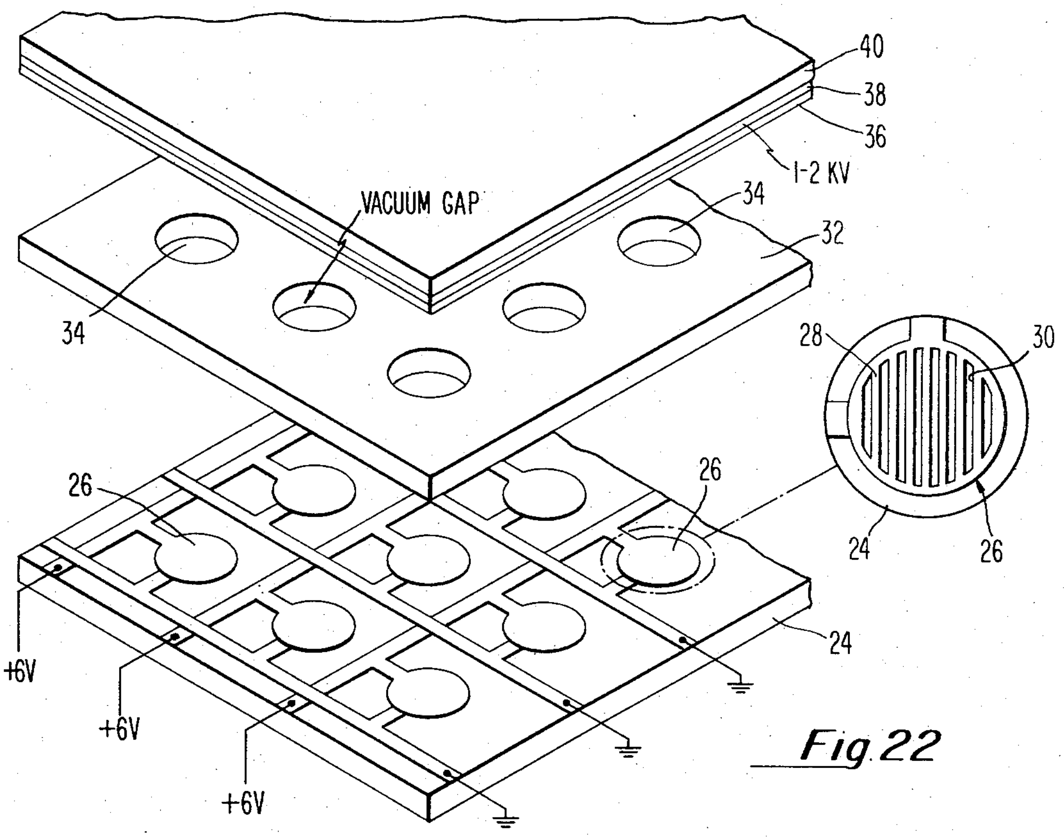
Figures 23, 24:
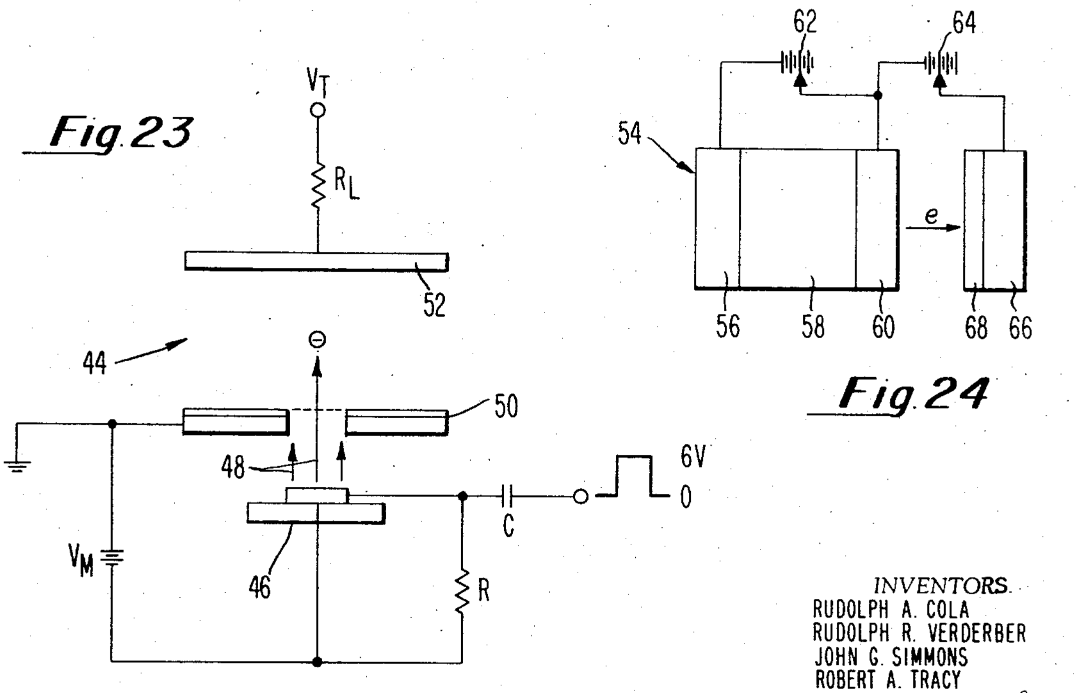
Figure 25:
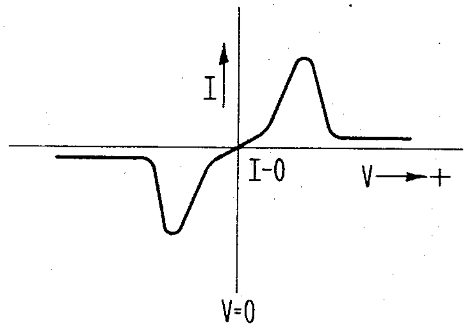
Figure 26:
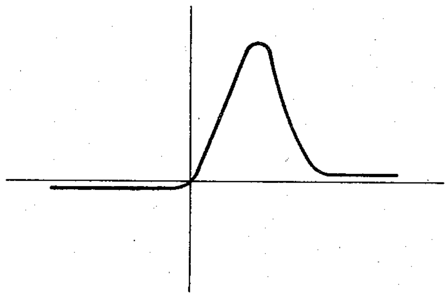
Figure 28:
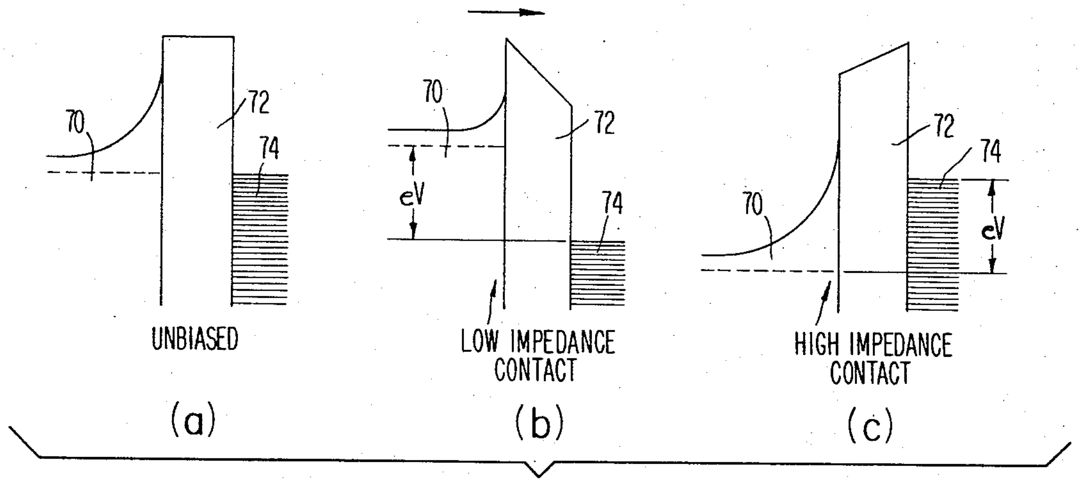
Figure 29:
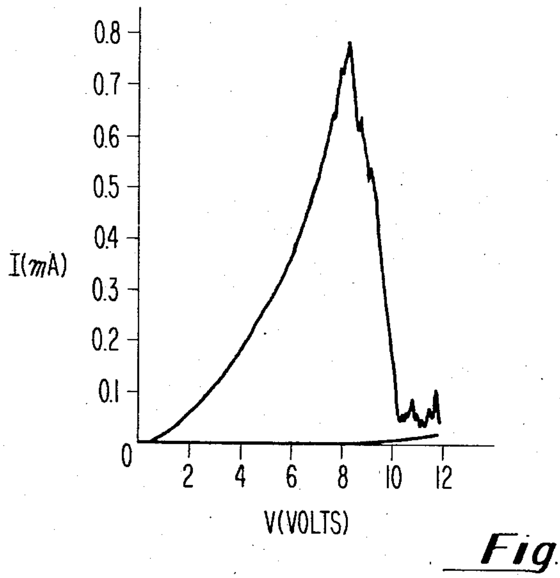
Figure 27:
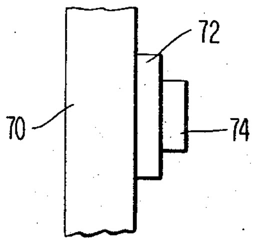

FIGS. 14*a* and 14*b* are detail schematic diagrams of utilization circuits for the present apparatus;

FIG. 15 is a graph of the loadlines for an M-I-M device;

FIG. 16 is a schematic diagram of a coincident voltage select M-I-M memory matrix;

FIG. 17 is a partial schematic diagram of a word select non-volatile memory matrix;

FIG. 18 is a graph of negative resistance I–V characteristic for a non-volatile M-I-M memory device;

FIG. 19 is a schematic diagram of a basic threshold circuit for the M-I-M device;

FIG. 20 is a schematic diagram of an equivalent circuit analyzing the circuit of FIG. 18;

FIG. 21 is a graph of the composite I–V characteristics of an M-I-M device and a parallel resistor $R_L$ tied to a voltage $V_L$;

FIG. 22 is an illustration of the method of fabricating an M–I–M emitter display panel;

FIG. 23 is a schematic illustration of a simple gas diode metal-insulator-metal device in accordance with the present invention;

FIG. 24 is a schematic illustration of metal-insulator-metal visual display apparatus;

FIG. 25 is a graph of curves representing the symmetrical I–V characteristics of a metal-insulator-metal device;

FIG. 26 is a graph of curves illustrating the asymmetric I–V characteristics desired for a metal-insulator-metal device useful for memory storage applications;

FIG. 27 is a schematic illustration of the structural arrangement of an M-I-M device utilizing a semiconductor as one of the electrodes;

FIGS. 28, *a*, *b*, and *c* are idealized energy diagrams explaining the behavior of the device of FIG. 27;

FIG. 29 is a graph of a curve illustrating the negative resistance characteristics of the device.

Figure 31:
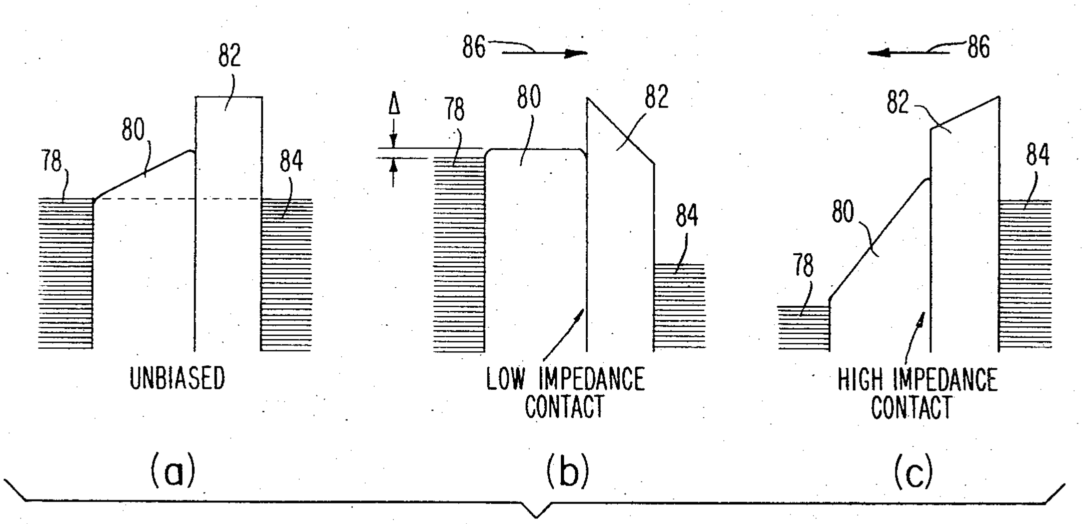
Figure 32:
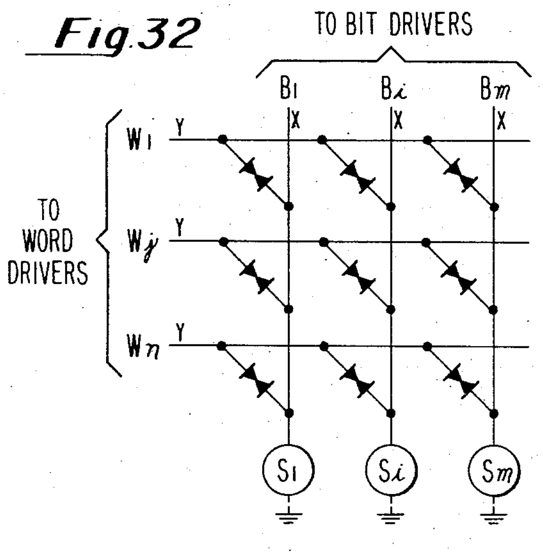
Figure 30:
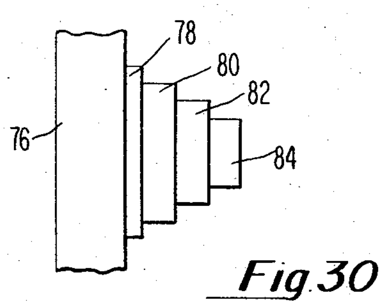
Figure 33:
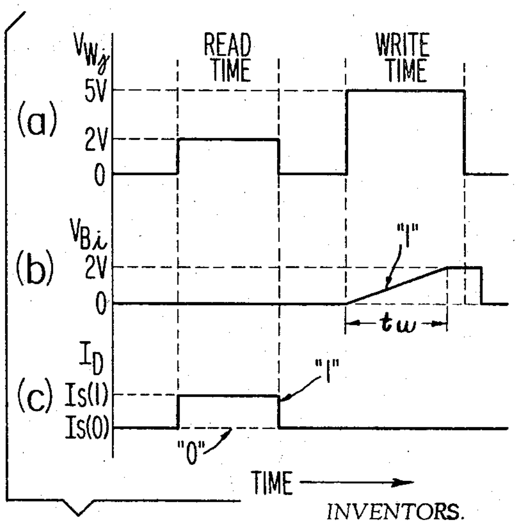

FIG. 30 is a schematic illustration of a modified M-I-M structure;

FIGS. 31, *a*, *b*, and *c* are energy diagrams illustrating the operation of the device of FIG. 30;

FIG. 32 is a partial schematic illustration of word select memory matrix;

FIG. 33 is an idealized timing diagram for the matrix of FIG. 32; and

Figure 34:
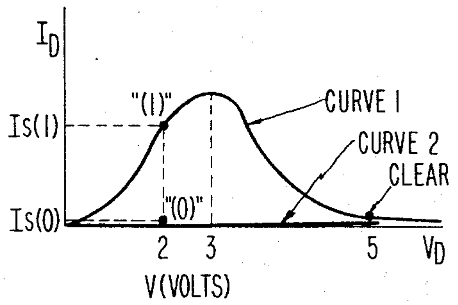

FIG. 34 is a graph of curves for the matrix operation of FIG. 32.

A detailed description of the structural configuration of apparatus embodying the present invention is illustrated in the accompanying drawings which will be described in turn as the description unfolds.

Observation of the I–V characteristic of the negative resistance region of the structure of the present apparatus demonstrates that the device has two stable states which may be designated, as hereinafter described in the drawings, as a "low impedance state" and a "high impedance state." The apparatus can be switched from one state to the other, and if certain rules for removing the voltage are obeyed, the device has the ability to "remember" the last state it has been in. An additional feature of the device is the emission of electrons from the apparatus in the "high impedance state." These electrons, when accelerated through a high voltage such as 1,000 volts, are capable of the exitation of a phosphor screen to make a glow which is clearly visible in a normally lighted room.

Other investigators have observed negative resistance in wet-anodized aluminum oxide films, evaporated aluminum oxide films, and evaporated silicon monoxide films that are between 100 to 2,000 Angstroms thick. These investigators have been primarily concerned with reporting the phenomenon in aluminum oxide and silicon monoxide films. At least one observer has postulated a transport mechanism which has been described as being space-charge-limited. The present invention is concerned with metal-insulator-metal sandwich construction and describes the electrical characteristics and the temperature dependence of the I–V characteristics of such devices. These measurements make it possible to verify a new theory, based upon tunnel hopping between traps which explains the transport mechanism of the present apparatus in its "low impedance" state. Utilizing this tunnelling transport theory, some of the observed electrical characteristics can now be reasonably explained.

The elements of the apparatus in accordance with the present invention are deposited (fabricated) in a vacuum system to permit successive depositions or different materials with different configurations without breaking the vacuum. This system has been described and claimed in a co-pending application in the names of J. G. Simmons, D. E. Moister and D. A. Starr, Jr., Ser. No. 238,-165, filed Nov. 16, 1962, and titled "Electronic Circuit Fabrication Apparatus" although it is recognized that other deposition equipment may be used. The step by step deposition of a typical metal-insulator-metal device 10 is illustrated in FIGS. 1*a–e* of the drawings as will now be described. The first step is to successively deposit chromium and gold contact pads 12 onto a dielectric substrate 14 e.g. glass microscope slide. The chromium allows the gold to adhere to the substrate 14. Cross strips of aluminum 16 are then deposited at approximately $10^{-7}$ torr to a thickness of approximately 2000 A. The aluminum is oxidized for approximately one week in an oxygen atmosphere at a temperature of 100° C. to form a layer of aluminum oxide 18 which is 20 Angstroms thick. A film 20 of either a metal halogen e.g. magnesium fluoride, or calcium fluoride or of an alkali halide e.g. LiF, LiCl, LiBr, NaF, NaCl, NaBr, KF, KCl, KBr, RbCe, and CsCl, 1,500 Angstroms thick, is then deposited over the oxidized aluminum cross strips 16 at $10^{-6}$ torr. Finally, a film of gold 22 also 1,500 Angstroms thick, is deposited over the magnesium fluoride in such a manner as to make contact with the end chromium gold pads 12. The substrates are maintained at room temperature for all depositions and the thicknesses of each material is measured with a multiple-beam interferometer. All materials are evaporated from tungsten boats and each substrate may contain ten devices (M-I-M) as desired.

In the newly fabricated metal-insulator-metal structure, it is necessary to introduce certain desirable changes in the magnesium fluoride insulator to obtain the special electrical property previously hereinabove discussed. It has been discovered that these changes may be made by a relatively simple "forming process." Typically, the gradual cycling of the device 10 from 0 to 6 volts D.C. and back to 0 volts, at a pressure of 15 microns of mercury, causes a drastic change in the insulating properties of the dielectric film 18.

Figure 1:
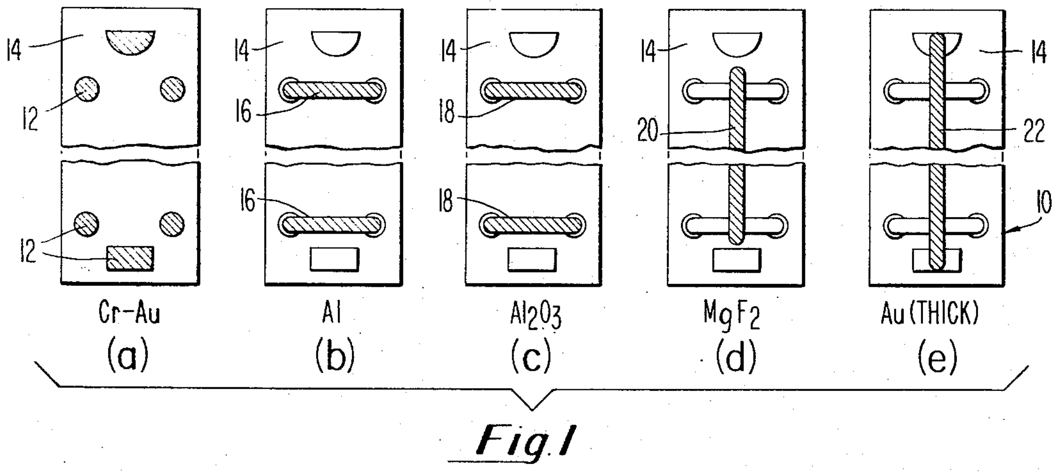
Figure 2:
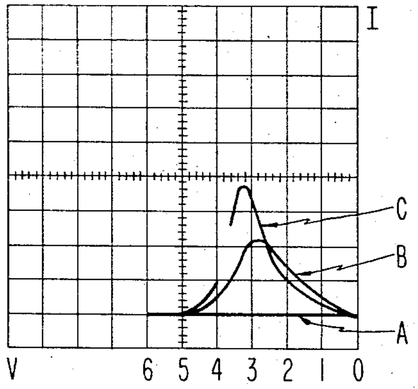
FIG. 2 is a graph of the I–V characteristic curves of the apparatus during the formation thereof.

Voltage current curves shown in FIG. 2 of the drawings depict the forming sequence and establish the conductivity through the insulator 20 and the negative resistance. Curve A shows the initial rise from 0 to 6 volts. The corresponding current values are quite small, indicative of a good insulator. When the voltage is reduced to 0 volts, curve B, it becomes immediately evident that some conductivity has been established in the insulator 20, and, at approximately 5 volts the I–V characteristics start to change quite drastically. A voltage decreases is accompanied by a current increase, signifying the onset of a negative resistance region. This behavior continues until the voltage is reduced to approximately 3 volts. Then a transition from the negative-resistance slope to a positive slope occurs, and a current maximum is observed. Any further decrease is accompanied by a decrease in current, and a 0 volts the current is 0 ma. The second increase of voltage across the device is shown on curve C and the same general I–V characteristics may be observed. The peak current and its observed voltage are slightly higher and appear somewhat noisy, as shown by the waveform. Repeated cycling, increasing and decreasing voltages, results in the forming of a relatively stable noise-free I–V characteristic as seen in FIG. 3.

For this particular structure, the peak currents associated with increasing voltages are generally two to three times greater than those peaks associated with decreasing voltages, and the peaks associated with decreasing voltages are shifted to a lower voltage by approximately 1 volt. In other devices which have been observed, the direction of voltage cycling has had little significant affect upon the I–V characteristics. The I–V characteristics of FIG. 3 are especially interesting since peak-to-valley ratios of 100 to 1 are indicated. The current density for the device is approximately 0.1 A./cm.$^2$. Other structures built in accordance with this invention have been observed to yield current densities as high as 5 A./cm.$^2$.

Figure 3:
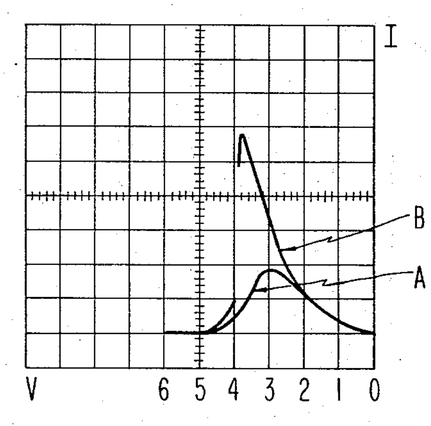
FIG. 3 is a graph of the I–V characteristic curves of a completed device according to the invention.

It should be noted that for FIGS. 2 and 3, the gold electrode 12 is positive with respect to the aluminum electrode 16. If the aluminum 16 is made positive with respect to the gold 12, the forming procedure yields results essentially the same as those shown in FIGS. 2 and 3. Devices have been formed that exhibit negative-resistance characteristic in quadrants I and III of the I–V coordinate plane.

The conductivity of the metal-insulator-metal (M-I-M) structure as a function of voltage is highly dependent upon the maximum voltage applied to the device. Therefore, as previously reported, the peak current $I_p$ has this same dependence. Exceeding this voltage at any time produces a permanent increase in conductivity. Thus, it is important to assure that the maximum forming voltage applied to the device exceeds the highest anticipated operating voltage by a reasonable safety margin. An advantage of this voltage dependence is that a simple control is available for matching the electrical characteristics of many devices.

Figure 4:
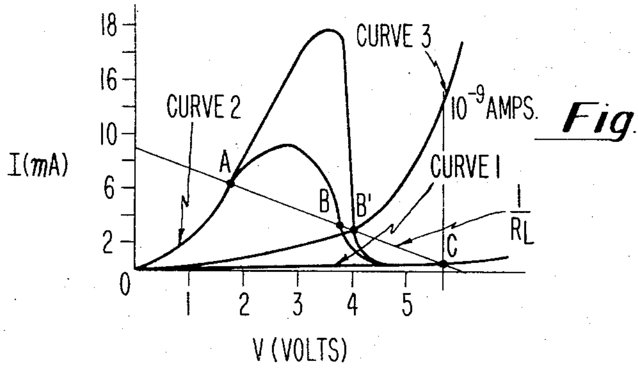
FIG. 4 is a graph of a family of curves illustrating how the I–V curves can be altered to form a bistable device according to the teaching of the invention.

As shown by the static curves of FIG. 3, the voltage-controlled-negative resistance of the device suggests its use in a variety of circuit applications. When a resistive load, $R_L$ and a voltage, V, are applied in series to the device, the characteristics are as shown in FIG. 4. This provides bistable states. Points A and C are the stable states and points B and B′ represent a single unstable state. The relevant intercept is determined by the switching direction. Bistable devices are used in computer memories, shift registers, counters, etc. Other biasing schemes for voltage control negative resistance devices generate the basic logic functions.

To determine the speed limitation of the device, the dynamic I–V characteristics are displayed on an XY-input oscilloscope. The voltage drive is a "low impedance" trapezoidal generator with slopes variable from 1 v./sec. to 1 v./μsec. It becomes immediately apparent that the response to the decrease in voltage for the negative-resistance region is somewhat slow. FIG. 5 shows the deterioration of the I–V characteristic when the voltage drops from 6 to 0 v. in 25 milliseconds. The comparison of curve A of FIG. 3 with FIG. 5 shows that the onset of the negative-resistance has been delayed in FIG. 5, and does not occur until the voltage is 3.7 v. and, also, that the peak current value has diminished. The "low impedance" positive slope, i.e. the region between 0 and 3 v. has also been affected adversely, the slope has decreased. A continued decrease in voltage fall time causes additional deterioration of the I–V characteristic. For a voltage fall time of 6 v. in 10 milliseconds, the characteristic collapses completely, and the device appears as a "high impedance" during the complete voltage excursion, see FIG. 6.

Under the conditions specified in FIG. 6, when this device is cycled to 0 v., the initial current response to a rise in voltage (6 v./0.4 sec.) appears quite different, see FIG. 7. The device now appears as a "high impedance" from 0 to 2.7 v. beyond which the current rises rapidly with further increases of voltage. Other observations show that the current peaks are higher, and the negative-resistance region has shifted to a higher voltage. When the voltage rise time is increased, a value is eventually reached which causes the peak current to decrease. For a rise time of 6 v./100 μsec., the peak vanishes completely, and the device is seen as a "high impedance" for the full voltage excursion.

When the "low impedance" positive slope of the I–V characteristic has been established in a properly formed unit, the dynamic current response to a voltage change in either direction appears to be quite fast for any point on this slope. The reason for this will become evident when the theory is discussed hereinafter. Point A in FIG. 4 is a typical point that responds in this manner.

The dynamic tests made on the device indicate that for an operating point on the "high impedance" part of the I–V characteristic, such for example, as point C in FIG. 4, it is possible to cycle the device from point C to 0 and back to point C along the path shown by curve 1. This phenomenon is independent of dwell time at the zero point, provided that the voltage rate of fall $$\Delta v_f/\Delta t > 600 \text{ v./sec.}$$

and the voltage rate of rise $$\Delta v_r/\Delta t > 6\times10^5 \text{ v./sec.}$$

Under these conditions, the device remembers over relatively long periods (at least 3 weeks) its previous "high impedance" path. The same is true for operating point A. The device may be cycled from point A to 0 and back to point A along the path indicated by curve 2 regardless of the dwell time at 0. For this "low impedance" portion of the curve, there are no minimum rise time or fall time requirements.

This memory feature has been demonstrated by simply inserting the unit in series with a suitable bistable "biasing network" for the device. After switching repeatedly between state C and state A to assure proper circuit operation, the device is placed in one of these states and the power is removed by opening the switch. After several weeks elapsed, closing the switch put the device back into the same state provided its rate of rise is $$\Delta v_r/\Delta t > 6\times10^5 \text{ v./sec}$$

From this, it is concluded that electrical power for the metal-insulator-metal device memory feature is needed only during non-destructive read or write periods. The number of read pulses that result in an alteration of the data state has not been firmly established. However, 15,000 read pulses have failed to disturb the information stored in the device.

The dynamic I–V characteristics discussed hereinabove give some indication of the switching speeds for the "low impedance" and "high impedance" states. For the bistable biasing arrangement shown in FIG. 4, switching times faster than 100 nanoseconds have been observed when switching from the "low impedance" state A to the "high impedance" state C. For these particular devices the switching speed from the "high impedance" to the "low impedance state is limited by that voltage rate of change which, if exceeded, causes a deterioration of the dynamic characteristics. This time is approximately 25 milliseconds. Other structures have been fabricated which improve the switching efficiency by several orders of magnitude while still retaining the memory feature.

Electron emission from relatively thick, i.e., >500 A., insulated metal-insulator-metal devices has been observed, and currents of $10^{-8}$ to $10^{-9}$ A. were observed at 6 v. The possibility of using this small current to provide a visual read-out for the bistable device seems very attractive. Emission currents of approximately $10^{-9}$ A. have been measured at 5 volts, in the region of "high impedance" and positive slope. Emission was not observed in the "low impedance" positive slope region. When the emitted electrons were accelerated to several kv. and were allowed to excite a phosphor screen, the light was clearly visible in a normally lighted room. It has also been observed that these electrons are emitted from the edge of the gold electrodes 12. A photomultiplier tube e.g. type 6328 was used to observe the fluorescence of the phosphor screen caused by these electrons. FIG. 8 illustrates the electrical output of the photomultiplier when the device is pulsed from 2.5 to 6 v. for 50 msec. to simulate "locking in" at points A and C in FIG. 4. Note, from FIG. 8 and curve 3 in FIG. 4 that light and hence electron emission is observed only when the device is in the "high impedance" state, and that the emission appears to be quite noisy.

The I–V characteristics of the device have been measured over the range of temperatures from 28° C. to −190° C. The device was enclosed in a vacuum-type container and pressure was maintained at approximately $10^{-3}$ torr. The I–V curves were recorded at each temperature with the D.C. X–Y recorder. An Fe-Constantan thermocouple was firmly attached to the surface of the substrate with cement. To lower the device temperature, the container was placed in a bath of liquid $N_2$. Qualitative examination of the device at room temperature, and at the temperature of liquid $N_2$ was done by cycling the device from 0 to 5 v. The formed device was cycled at room temperature and again at −190° C. The curves at both temperatures were quite similar from 0 to 5 v. However, upon returning to 0 volts, the negative-resistance region disappeared when the device was lowered to the liquid $N_2$ temperature. At this low temperature, the device remained in the "high impedance" state even after the voltage was cycled to 10 v.

The device was reformed at room temperature, and when cycled between 0 and 1 v., the I–V curves were exactly reproducible. The I–V curves were then recorded for the 0 to 1 v. range at various temperatures between room temperature and —190° C. The I–V curves illustrated in FIG. 9, show a 12% decrease in current for a 218° C. decrease in the device temperature. The second I–V curve at room temperature, which was recorded after the device had been at the liquid nitrogen temperature was the same as the initial I–V curve at room temperature. These results illustrate that the measured temperature dependence was reversible and was not due to any permanent structural change in the device.

There are several features of the apparatus that suggested the proposed model of the electron transport by tunnel-hopping through traps. Two features which bear most heavily on suggesting the proposed mechanism are that the temperature dependence of the I–V characteristics is similar to that found for tunneling phenomena through ultra-thin insulators, and that the certainty that the deposited insulator possesses many defects indicates a high trap density.

Figure 10:
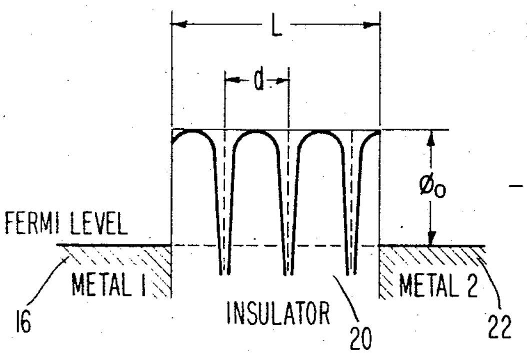
FIG. 10 is an idealized energy diagram of an M-I-M device with traps and in an unbiased condition.

The energy diagram of a model of a metal 16-insulator 20-(with traps)-metal 22 structure with no bias is shown in FIG. 10. The insulator 20 presents a barrier height $\varphi_0$ for electrons in metal one (16). The average spacing for the tunnelling trap is $d$, and the thickness of the insulator is L.

Tunnelling will be considered to be at the fermi level only.

Figure 11:
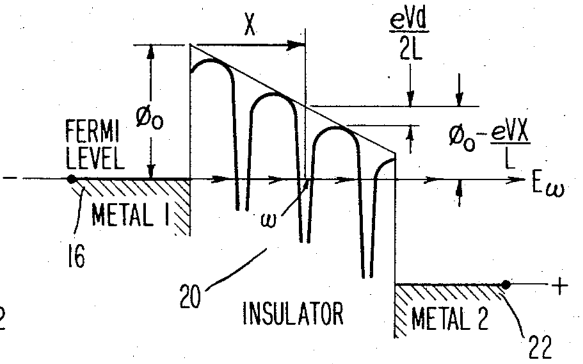
FIG. 11 is an energy diagram of the device with the second metal positively biased.
Figure 12:
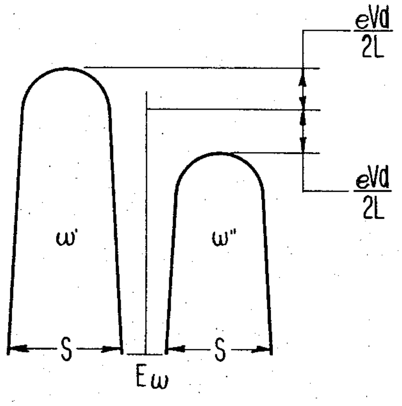
FIG. 12 is an energy diagram of a trap within the insulator with the device biased.

FIG. 11 is an energy diagram of a diode with the voltage bias between the electrodes. Metal 2 (22) in FIG. 11 is positively biased. Consider an electron in trap W; the problem then, is to determine the probability that the electron will travel from negatively biased electrode 16 to the positively biased electrode 22. If it is assumed that the thickness of both barriers $w'$ and $w''$ in FIG. 12 at the electron level is S, it then can be shown that the probability of the electron penetrating the barrier is $$D(E_w)\simeq\exp\left(\frac{-4\pi(2m)^{1/2}}{h}s\bar{\varphi}^{1/2}\right)$$

Where $\bar{\varphi}$ is the average barrier height above the energy level $E_W$, $m$ is the electron mass, and $h$ is Planck's constant. Now, the mean height of barriers $w'$ and $w''$ above $E_W$ is $$\bar{\varphi}_{w'}\simeq\varphi_0-\frac{eVx}{L}-\frac{eVd}{2L}$$

and $$\varphi_{w''}\simeq\varphi_0-\frac{eVx}{L}+\frac{eVd}{2L}$$

respectively. The probability of the electron tunneling to the positive electrode, therefore, is $$D(E_w)\simeq exp\left\{\left[-\frac{4\pi(2m)^{1/2}}{h}s\left(\varphi_0-\frac{eVx}{L}-\frac{eVd}{2L}\right)^{1/2}\right]-\left[-\frac{4\pi(2m)^{1/2}}{h}s\left(\varphi_0-\frac{eVx}{L}+\frac{eVd}{2L}\right)^{1/2}\right]\right\}$$

Since $Vd/2L\ll\varphi_0-eVx/L$, the expression for $D(E_W)$ can be expanded to (1)

$$D(E_w)\simeq exp-\left[\frac{4\pi(2m)^{1/2}}{h}s\left(\varphi_0-\frac{eVx}{L}\right)^{1/2}\right]\left\{exp\left[\frac{4\pi(2m)^{1/2}}{h}s\frac{V_d}{4L\left(\varphi_0-\frac{eVx}{L}\right)^{1/2}}\right]-exp\left[-\frac{4\pi(2m)^{1/2}}{h}s\frac{Vd}{4L\left(\varphi_0-\frac{eVx}{L}\right)^{1/2}}\right]\right\}$$

$$\simeq 2\ exp\left[-1.025\,s\left(\varphi_0-\frac{eVx}{L}\right)^{1/2}\right]\sin h\left[\frac{0.256\,sVd}{L\left(\varphi_0-\frac{eVx}{L}\right)^{1/2}}\right]$$

where $\varphi_0$ is expressed in volts, and L, $s$, and $d$ are in angstroms.

The current associated with this trap, therefore, is (2)

$$J_w\simeq 2\,\nu P\ exp\left[-1.025\,s\left(\varphi_0-\frac{eVx}{L}\right)^{1/2}\right]\sin h\left[\frac{0.256\,sVd}{L\left(\varphi_0-\frac{eVx}{L}\right)^{1/2}}\right]$$

where $\nu$ is the "attempt-to-penetrate" frequency, and P is the percentage of time that the trap is occupied. The current is limited by the maximum barrier seen by the electron; that is, the current is limited by the barrier at the negatively biased electrode-insulator interface, where $x=0$. Substituting $x=0$ into Eq. 1 yields $$J\varphi_0\simeq 2\,\nu\,P\ exp[-1.025\,s\varphi_0^{1/2}]\sin h\left[\frac{0.256\,sVd}{L\varphi_0^{1/2}}\right]$$

Thus, $$J\propto\sin h\ (kv)$$

where $$k=\frac{0.256\,sd}{L\varphi_0^{1/2}}\quad(3)$$

Figure 13:
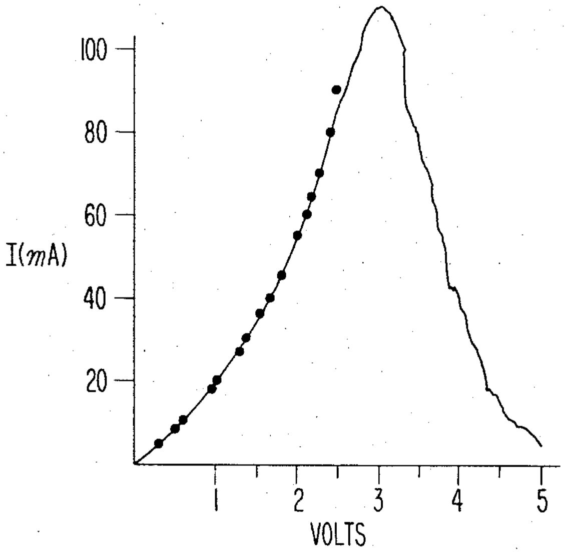
FIG. 13 is a graph of the I–V characteristics of the device as compared with a theoretical curve for the device.

The excellent fit between the theoretical and experimental curves for the "low impedance" portion of the I–V curve is shown in FIG. 13. If $k$ is determined from the experimental curve of FIG. 13, it may be assumed $d\approx s$, and obtain, from Eq. 3.

$$d\simeq\left(\frac{k\varphi_0^{1/2}L}{0.256}\right)^{1/2}\quad(4)$$

From the experimental curve of FIG. 13, it is known that $k$ is equal to 0.9, L is equal to 1,500 A., and that a reasonable value for $\varphi_0$ is one volt. Thus $d=72°$. The fact that space in between traps is less than 100 A. is further evidence for acceptance of this tunnelling model.

It can be seen from the foregoing that the transport of electrons through the device is by electron tunnelling through aligned traps (tunnelling traps). As the voltage is further increased, a voltage is reached at which electrons begin to enter the conduction band of the insulator. After traversing a short distance in the conduction band (the electronic mean free path), most of the electrons are in thermal equilibrium, and fall into the traps of the insulator thus causing a decrease in current. Furthermore, the electrons falling into the deeper traps tend to stay, and cause an increase in the insulator barrier height. These two factors cause the experimental curve to deviate from the theoretical curve, and a negative-resistance region thus appears. Thus, the peak of the "low impedance" region is governed by the voltage across the insulator, and not by the field in the insulator. This effect should be independent of insulator thickness. This type of voltage dependence has also been reported previously by experimenters who have found the peak currents to occur at the same voltage for insulators of different thicknesses.

The two states of the device can then be characterized as (1) where the traps are empty, the "low impedance"

state; and (2) where many traps are filled, the "high impedance" state: It can then be understood why switching from the "high impedance" state is much slower than switching from the "low impedance" state. Switching from the "high impedance" state, the traps must be emptied to permit a path for the tunneling electrons. The fact that the electrons are permanently trapped in the "high impedance" state can also account for the memory capabilities of the device. As described by the model, some of the electron emission occurs when electrons are tunnelling into the conduction band of the insulator. While some electrons may drop into traps, there are apparently other electrons with energies that are higher than the electron affinity of the insulator which is usually small. As previously described, a small current ($10^{-8}$ to $10^{-9}$ A.) is emitted but not from the Au electrode 22. Rather, this current is emitted from the insulator 20 close to the gold electrode 22 or through a ruptured portion of the gold electrode.

Therefore, it can be seen, that this simple model accurately predicts the shape of the initial portion of the I–V curve, and results in a reasonable value for the distance between traps. Utilizing the model, many of the pertinent phenomena which have been observed can be explained and each explanation is consistent with proposed model.

In the network of FIGURE 14A, two bistable states are achieved. This is illustrated in FIGURE 15, where the load line, L, intersects the characteristic I–V curve of the M-I-M device at the points A and B. A basic memory cell utilizing a M-I-M device is shown in FIG. 14B. Values of a binary variable may be assigned to the two stable states. Switching from one state to the other can be accomplished in a variety of ways, including stimulation by light to empty traps, although controlling the source voltage appears to be the simplest. Switching from state A to B occurs when the source voltage E is increased by an amount ΔE altering the load line as shown. Returning the source voltage to E shifts the operating point to B. Switching from state B to A occurs when the bias voltage E is decreased by ΔE and then returned to E.

In a *n* x *m* M-I-M memory matrix, a scheme to select and write information into the $X_i Y_j$ element is required. A simple selection scheme involving coincident voltage techniques is shown in FIG. 14*b*. The load line for the two equal bias resistors, R, is still defined by the equivalent bias voltage, E and resistor $R/2$ as shown in FIG. 15, and the two stable states are A and B.. When the device is in the "high impedance" state (*b*), a momentary bias voltage decrease of $\Delta E$ to both the $X_i$ and $Y_j$ lines will cause the device to switch to state A'. Removal of this bias allows a transition to state A. A decrease of bias of $\Delta E$ to a single line ($X_i$ or $Y_j$ but not both) results in a half select condition, this is shown by the intersection of the static curves at B''. Restoring the bias to E will cause the circuit to return to state B. When the device is in the "low impedance" state, A, a momentary bias increase of $\Delta E$ to both inputs will cause the device to switch to state B'. Removal of the bias allows the transition to B. Point A'' represents the half select conditions where $\Delta E$ is applied to a single input.

The state of a memory element should be available for interrogation, preferably in a non-destructive manner. The simple select scheme described for a "write" operation may also be used for a "read" operation provided they are allotted different times in the memory cycle. When the bias supply, (FIG. 14*b*) for the two input resistors, R, is decreased by an amount $$\Delta\frac{E}{2}$$

the equivalent load line is shifted as shown in FIG. 15 and the stable states are now A''' and B''. A shift of state B to B'' produces a negligible change in device current, while a shift from A to A''' produces a comparatively large change in device current. "Low impedance" sensing circuits can be introduced in the ground circuit of the devices which will produce an identifying output signal for each of the two stable states. Note that responses were obtained without changing the state of the circuit.

Coincident voltage select M-I-M memory matrix is shown in FIG. 16. In a typical operation of the FIG. 16 memory matrix, all X and Y lines are maintained at a fixed potential of E volts. In writing or in a reading operation upon the individual cells, the Δ voltages are selectively applied as hereinabove described. Sense amplifier connections are not shown because special cancellation techniques are usually employed to eliminate the noise generated ont the sense lines by the $(n+M-2)$ elements half selected during the read cycle.

A word select M-I-M memory is shown in FIG. 17 where $Y_j$ is a word and $X_i$ a bit. In a typical memory such as shown in FIG. 17, the word lines and bit lines may be operated in either a powered or a non-powered mode. In the former, all row conductors may have E volts continuously applied and all column conductors may have zero volts applied. It is understood that the row voltages may be of said other value such as $+E/2$ volts and the column potential $-E/2$ volts or some other combination providing a total of E volts across all cells for the proper bistable load line operation heretofore described. To non-destructively read a word out of the memory, $Y_j$ is pulsed by $$\Delta\frac{E}{2}$$

All devices of row $Y_j$ provide a signal (large or small current change) into a column line going to ground via individual sense amplifiers. In this scheme, there are no half-selected devices; thus, noise is greatly reduced.

Writing is accomplished by applying to a selected word line suitably polarized $$\Delta\frac{E}{2}$$

voltage to the existing voltage E and then the bit drivers ($X_i$) apply a positive or negative $$\Delta\frac{E}{2}$$

pulse depending on the desire to write ONES or ZEROS. It will be recalled that in order to write into a low impedance state, the potential ΔE must be applied across the cells for at least a period of 25 milli-secs.

In a "power-off" mode, the cells of the matrix are assumed to be in either a "high" or a "low" impedance state. Application of a potential E to the selected word line $Y_i$ and a potential of $\pm\Delta E$ in parallel fashion to the selected bit lines $X_i$ will cause the $Y_j$ word cells to store a "0" or "1" representing a high or low impedance. Thereafter all voltages may be removed within the 10 milli-sec. limitation permitting the word *j* cells to retain their stored impedance condition. To non-destructively read the *j* word, a voltage $V_s$ (FIG. 18) is applied to that row and the current change in the column line may be sensed to determine the storage state of each of the *j* cells.

This scheme is adaptable not only to a "power-on" or "power-off" memory but also to a display panel, and in both cases, results in a significantly reduced problem of fabrication at higher densities of devices per unit area.

For display purposes, the FIG. 17 matrix is operated in a "power-on" mode with E volts on the Y rows and zero volts on the X column wires as described in connection with the memory application above. Selective store is obtainable with this configuration. If desired, the display may also be electrically non-destructively sensed. A desired word may be sened by the application of a $$\pm\Delta\frac{E}{2}$$

voltage to the selected Y line and the $dI/dT$ of the X lines is then detected.

A pattern for the above described display apparatus can be fabricated in a multi-layer structure, including the resistor as follows:

(1) Deposit conductors in lines (or totally and photo-etch to lines).
(2) Deposit high-resistance material over conductors.
(3) Deposit Al spots on resistive material.
(4) Oxidize.
(5) Deposit $M_gF_L$, covering $Al_2O_3$.
(6) Deposit Au counter strips.

With this procedure, 200 devices per linear inch will be achievable.

A bistable operation was previously described herein, with reference to FIG. 14*a* and FIG. 15. A second operating mode for the M-I-M device is the monostable or "one-shot" mode. When the bias circuit includes resistor $R/2$ and bias supply $(E-\Delta E)$ shown in FIG. 15, the only stable state is A'. Changing the voltage from $(E-\Delta E)$ to $(E+\Delta E)$ will cause the device to switch to state B'. The circuit will remain in this state until the bias voltage is once again restored to $(E-\Delta E)$. The circuit will then switch from state B' to A' in a time period determined by the time constant of the external circuit. Dwell times in state B' can be made longer than the width of the trigger pulse simply by inserting an inductance (not shown) in series with resistor $R/2$.

An electrically alterable memory requiring no standby power (non-volatile) and a fast non-destructive read (>.1 μsec.) may be achieved as described hereinbelow. This scheme utilizes an M-I-M device as hereinbefore described and eliminates the need for a bistable resistive load-line. Because of this, it is not necessary to have uniform peak or voltage currents and variations in the I–V characteristics, i.e. due to aging (life), are no longer critical and tolerances on the various memory parameters can be relatively broad.

The operation of a typical M-I-M device is set out hereinafter with respect to FIG. 18. Initially all cells in a typical memory are either in the "zero" or "one" state. If $V_e$(~6 v.) is applied to all cells including the *ij* cell the deep traps associated with all cells are filled. This "filling" operation arbitrarily may be designated an "'erase."

In order to write a zero into the desired cells, V*e* is quickly removed in a time <10 milli-secs. Note that this rapid excursion of voltage causes the I–V characteristic to follow curve A of FIG. 18. With no voltage across the device, all traps in the cell are filled and the device impedance is "high."

In order to write a "one" into the cell memory the voltage V is lowered from V*e* to zero in a time which will allow curve B to be traced out. With no voltage across the device, all traps in the cells are essentially empty and the device impedance is "low."

All cells of a given row can be selected for a read operation by simply applying a small voltage of approximately V*s* to the desired device being interrogated. A current sensing device (not shown) can utilize the large difference between $I_B$ and $I_A$ to indicate a zero or a one for each column. Read times can be less than .1 μsec. and the information undisturbed with $V_s<2.5$ v.

Because of the bistable characteristic of an M–I–M device, it can be utilized to define two logical states (zero and one), and may therefore be used to perform logic. A resistor-coupled threshold circuit is illustrated in FIG. 19. It is advantageous to think now in terms of a current threshold and control, rather than a voltage type. The "*n*" input resistors provide the coupling from other logic stages. The voltage applied to these inputs represents the logical state of the $(j-l)$ stages. The bias network of $E_K$ and $R_K$ deliver a constant current of $i_K$ to node N since $E_k \gg V_d$ and $R_i \ll R_K \gg R_L$. Resistors $R_o$ are the outputs from the *j* stage which propagate the signal information to the $(j+l)$ stages, which are in one of the two voltage defined logical states, $V_L$ or $V_H$.

To determine the logical gain of such a circuit, a simplified equivalent circuit is analyzed with reference to FIG. 20. This model considers only a single input, whose initial state is $V_L$, and assumes all output resistors are coupled to stages that are in the $V_L$ logical state.

Considering the M-I-M device and resistor $R_L$ as a single unit, the combined static V–I characteristic is shown by the solid curve in FIG. 21. This curve is determined by the individual characteristics of the two elements shown by the dotted curves. When a constant current flows into node N, it will cause potential $V_D$ to rise. For a value of $i_K$, voltage $V_D$ equals $V_L$ one of the logic voltage states. This is shown by the constant current load line $i_K$ intersecting the static curve at point A. The output current $I_L$ and the input current thrugh $R_i$ is zero, and the entire bias current $i_K$ flows into the M-I-M device. Note that a second stable state exists at intercept B which corresponds to the other logic voltage state $V_H$. When the $j-l$ stage switches from state $V_L$ to $V_H$ the current $i_i$ flowing into node N is $$i_i=\frac{V_H-V_D}{R_i} \quad (1)$$

Since the trigger current $i_i$ a function of the node voltage $V_D$, the requirement for a switch from state A to B is $$i_i/V_p \geq i_p - i_k \quad (2)$$

or $$\frac{V_H-V_P}{R_i} \geq i_P - i_K \quad (3)$$

Considering only the equality situation, Eq. 3 can be written as $$\frac{V_H}{R_i}=i_P-i_k+\frac{V_P}{R_i} \quad (4)$$

The logical gain G is defined as the ratio of output current associated with state B to the maximum trigger current required to switch from state A to B or $$G=\frac{i_L/V_H}{\bar{i}/V_L} \quad (5)$$

From Eq. 1 it is seen that $i_i=\bar{i}/V_L$ when $V_D=V_L$, therefore $$\bar{i}_i/V_L=\frac{V_H-V_L}{R_i} \quad (6)$$

then from expression 4, expression 6 is $$\bar{i}/V_L=i_P-i_K+\frac{V_P-V_L}{R_i} \quad (7)$$

The dynamic load line for switching from stable state A to B is shown by the dotted curve A–A'–B. The ordinate difference between the dynamic load line and the static V–I curve is the current available for charging the device and stray capacitance during the voltage rise from $V_L$ to $V_H$. At point B the trigger current $i_i$ is once again zero, and the constant level of bias current $i_K$ has switched essentially from the M-I-M device to the load R since $$i_L/V_H \simeq i_K \quad (8)$$

Therefore, the logical gain is $$G \simeq \frac{i_L/V_H}{\bar{i}/V_L} \simeq \frac{i_K}{i_P-i_K+\frac{V_P-V_L}{R_i}}$$

From expression 8 it is seen that large logical gains may be obtained if the bias current $i_K$ is made to approach the threshold current $i_p$. Note that an increase in $i_K$ will also increase the value of $V_L$ in expression 8 resulting in an additional increase to G. Tolerance and other problems usually restrict the logical gain for such a two-terminal device to a value of 2 or 3.

If the amount of current required for triggering is equally contributed by "$n$" inputs the threshold circuit is an "AND" gate of $n$ inputs. If each of the inputs can provide the necessary triggering current to switch the threshold circuit then it becomes an "OR" gate of $n$ inputs. By assigning appropriate weights to the inputs and bias of the threshold circuit, it is possible to perform sophisticated logic such as "$m$ of $n$" input gates and majority logic gates, etc. For the bistable mode a reset pulse is needed after the logic operation is over. The threshold logic described above can be operated in the monostable mode by simply changing the value of $i_K$. The advantage of this latter type operation is that the reset is made automatically. Other possible circuit applications for M-I-M devices are Scalers, Shift registers, Flip-Flops, function generators, squaring circuits, hybrid circuits, etc. It should be noted that in this discussion, it was assumed that M-I-M switching times and current peaks are the same for increasing and decreasing voltages.

Electron emission into a vacuum gap has been observed when voltages in excess of three volts is applied to the device. The magnitude of this electron current appears to be a function of the voltage applied. Emission currents as high as $10^{-4}$ amps/cm.$^2$ have been observed at 6 volts. When the emitted electrons are accelerated to a few kilovolts they can excite a phosphor screen to a high light brightness. The light emitted from the screen appears to be a replica of the edges of the active area o fthe M-I-M device and is easily observed in a lighted room.

The possibility of combining the storage feature of the device with its electron emission properties makes the device especially promising in small or large display applications where local updating is desired. FIG. 8 is a graph of the light emitted from a 2 kv. phosphor screen when a bistable M-I-M circuit is placed in the "high impedance" state. Excitation is caused by electrons emitted from the structure. No visible signs of excitation were observed for the "low impedance" state. This "on-off" electronic control of light and M-I-M's ability to store information for long periods of time makes the device very useful.

A display tube can be made using these film devices in several ways. One very promising technique consists of the matrix arrangement shown in FIG. 17. In this configuration, coincident voltage pulses on lines $X_i$ and $Y_j$ will operate cell $ij$ only. The rest of the cells will be left in their prior states of "off" or "on."

To achieve a thin tube structure and, at the same time, a large display area, as seen in FIG. 22, an insulating substrate 24 e.g. a glass plate, can be utilized to support one or more thin film emitters 26. Emitters 26 can be produced by photolithographic techniques thereby permitting densities of 200 dots per linear inch in both dimensions. The emitter configuration can be, for example, in the form of a grid 28 of fine elongated parallel, spaced apart openings 30 thereby multiplying the effective emitting area of the dots.

A relatively thin plate like dielectric member 32, e.g. Photoceram, manufactured by Corning Glass Co., Corning, N.Y., is provided with apertures 34, as by selective etching at locations corresponding and in register with the emitters 26.

A phosphor screen 36 is disposed over the member 34 in contact with a metal oxide conductor 38, e.g. tin oxide. A protective glass member 40 completes the display structure.

By simple masking techniques the anode 26 of the M-I-M portion of the device can be made to have any shape desired. If the electric field in the vacuum gap is perpendicular to the anode and is reasonably uniform, the visible display will have essentially the same shape.

Cold cathode gas diodes are used in many important "on-off" applications requiring negligible stand-by power and applications where control of power at large gains are desired. Two serious limitations of such a device are the rather random firing times encountered over a range of environmental situations, and the decrease in input control sensitivity caused by firing voltage variations, observed initially in such tubes and during the operating life thereof.

Contirbuting causes to the above deficiencies can be obtained from the experssion for "dark current" in the Townsend Discharge region which is (1)
$$I=I_o\frac{e^{\eta V}}{1-\gamma(e^{\eta V}-1)}$$

$I_o$ is the initial emission current due to the sum of all electron supplying mechanism i.e. cosmic radiation, photoemission, etc.; V is the voltage cross the gap, $\eta$ is the gas ionization coefficient and $\gamma$ is the secondary ionization coefficient (related to the work function of the cathode). $I_c$ is that critical value of $I_o$ where space charge effects must be considered and Eq. 1 no longer applies for the condition $I_o \geqq I_c$. When V is equal to the breakdown voltage ($V_B$) the denominator of expression 1 approaches zero and the discharge is self-sustaining therefore, $V_B$ is defined by $$\gamma(e^{\eta V_B}-1)=1$$

(2)
$$V_B=\frac{1}{\eta}1\eta\left[1+\frac{1}{\gamma}\right]$$

Expression 2 indicates the breakdown ($V_B$) is dependent on the coefficient $\eta$ and to a lesser degree on $\gamma$. During tube life, gaseous contaminants evolving from the tube walls and electrodes will alter $\eta$, and changes to the low work function surface on the cathode effect $\gamma$, resulting in breakdown voltage variations.

When $I_o \geqq I_c$, space charge effects appear which reduce the breakdown voltage from the constant value $V_B$, defined by Eq. 2, to a lower value ($V'_B$) dependent on the magnitude of $I_o$. Breakdown voltage $V'_B$ can approach the voltage required for sustaining the discharge ($V_s$) by providing sufficient $I_o$ current.

When $I_o << I_c$, large random turn-on delays can result due to a statistical and formative lag in developing the electron avalanche. This condition can occur to tubes that are placed in day-light free environment; the photoemission contribution approaches zero, therefore, $I_o << I_c$.

A solution to the gas diode deficiencies is now described with reference to FIG. 23. Into a tube 44 an auxiliary source of electrons 46 i.e., a M-I-M type electron emitter is introduced. For the "off" conditions the M-I-M source 46 is inactive. $I_o$ is determined by environmental conditions, and the breakdown voltage is $B_B$. To keep the main discharge off, the tube voltage ($V_T$) should be less than the minimum breakdown voltage encountered ($\underline{V}_B$). In order for the discharge to sustain itself, $V_T$ should be greater than the maximum sustaining voltage ($\overline{V}_S$) encountered, therefore $$\underline{V}_B < V_T > \overline{V}_S$$

When the M-I-M emitter 46 is turned "on," the condition $I_o >> I_c$ prevails and the breakdown voltage $V'_B$ is less than $V_T$, therefore the gas diode 44 turns on. The large value of $I_0$, irrespective of environment reduces random firing times to values approaching that of a hot thyratron. A gas diode having an M-I-M emitter as a triggering element is shown in FIG. 23 with the necessary supporting circuitry. A pulse of approximately 6 volts is required to cause emission, arrows 48 from the M-I-M device and hence trigger the main discharge from cathode 50 to anode 52.

It is known that solid state luminescence can occur in highly doped insulator materials making them look more like semi-conductors. A solid state cathode luminescent display can be produced in accordance with the present invention as illustrated in FIG. 24. Electrons in the valence band are excited by high energy electrons into the conduction band and their transition to the impurity levels result in the emission of light characteristic of the depth of the impurity levels in the materials. The structure of FIG. 24 comprises M-I-M device 54 including a metal electrode 56, an oxide insulator member 58 <100 A. thick and a metal electrode 60 <100 A. thick. Suitable potentials from source 62 and 64 are applied to the electrodes 56 and 60 and to the conductor 66 carrying a phosphor layer 68. Electrons are emitted from the tunnel emitter and some may pass through the thin counter electrode metal. A large field accelerates the electrons through the vacuum (arrow *e*) and are incident upon the phosphor screen 68 which is backed-up by a transparent electrode 66 (ZnO). The accelerated electrons stimulate the electrons which results in the emission of light from the screen 68.

The present M-I-M device appears to have symmetrical I–V characteristics about the origin of the I–V graph as seen in FIG. 25. When employed in a memory structure, this feature may tend to produce so called "sneak paths" when the device is reverse biased. The sneak paths are usually overcome by the introduction of the diode at a suitable point in the memory circuit so as to produce the desired curve of FIG. 26. This additional element adds to the cost and circuit complexity and if eliminated would make a much simplier, efficient and less costly apparatus.

The characteristic of FIG. 26 has been realized in practice by altering the basic structure of the M-I-M device e.g. by eliminating one of the metal electrodes and replacing it with an N-type (low resistivity 1Ω cm.) semiconductor. Such a structure is shown in FIG. 27 wherein a wafer 70 of N-type silicon is provided with a layer 72 of a metal halogen e.g. magnesium fluoride and over which the electrode 74, e.g. aluminum is disposed as by evaporation, etc. This arrangement (a diode) behaves as illustrated in the energy diagrams of FIG. 28, *a, b* and *c*.

FIG. 28*a* shows the device without a bias applied i.e. the Fermi levels are coincident in the semiconductor 70 and the metal electrode 74. FIG. 28*b* illustrates the case with the semiconductor 70 forward (negatively) biased. In this instance, the semiconductor insulator ($M_gF_2$) contact is "low impedance" so that the I–V characteristic is determined solely (apart from a slight voltage drop across the semiconductor contact) by the insulator ($M_gF_2$) 72, which is assumed to be formed. Thus, there is generated the typical negative resistance curve shown in quadrant I of FIG. 26. When the semiconductor 70 is positively biased, the semiconductor-insulator junction is now reverse biased as in FIG. 28*c*, and hence is high impedance —much higher than the reactance of the formed $M_gF_2$ insulator 72 and the sneak paths, so called, are effectively eliminated. Thus the semiconductor-insulator junction impedance determines the device characteristic as seen in quadrant 3 of FIG. 26. The plot of the I–V characteristics of such a device as constructed and operated is shown in the graph of FIG. 29. A device demonstrating the foregoing I–V characteristics can be constructed solely by evaporation techniques utilizing an insulating substrate as shown in FIG. 30 and FIGS. 31, *a, b,* and *c*. A glass or other similar supporting member 76 has evaporatively disposed thereon a layer of indium 68, then a layer of cadmium sulphide 80 and then a layer of magnesium fluoride 82. Finally a layer of aluminum 84 is applied to form the upper contact of the device. In the unbiased condition, FIG. 31*a*, the Fermi levels of the indium and the aluminum are coincident as was the case in FIG. 28*a*, with the semiconductor and the aluminum.

With the cadmium sulphide 80 forward biased as in FIG. 31*b* there is essentially no barrier at the indium-cadmium sulphide interface i.e. Δ the barrier is extremely small and electrons can flow (arrow 86) in the cadmium sulphide. There is thus a 'low" impedance contact between the cadmium sulphide and the magnesium fluoride. In the reverse biased condition of FIG. 31*c* and i.e. with the aluminum negatively biased relative to the indium a blocking contact is formed between the magnesium fluoride and the cadmium sulphide. The cadmium sulphide appears as a "high" impedance compared to the magnesium fluoride so that most of the potential is dropped across the cadmium sulphide and as a result this determines the characteristic of the device. The analog between the device of FIGS. 28, *a, b,* and *c* and the device of FIGS. 31, *a. b,* and *c* is readily apparent from the foregoing.

On the basis of the description hereinbefore set forth a "word" organized, non-destructive read memory can be achieved with the geometrical arrangement and the pulse train shown in FIGS. 32 and 33. In this scheme all bits $B_1, \ldots, B_i, \ldots, B_m$ of a given word are handled simultaneously during read and write operations, and it is observed that no cell resistors are required.

To read a word non-destructively from the memory plane approximately 2 volts is applied to the $W_j$ line. Cells $X_iY_j, \ldots, X_iY_j, \ldots, X_mY_j$ will limit the current into their respective columns lines depending on the device impedance, curve 1 or 2 of FIG. 34. The corresponding 2 volt point on curve 2 is arbitrarily a binary "0" and virtually no current will flow into the low impedance sense circuit from those devices that are high impedance. Those devices that are low impedance (binary "1") will cause a current of $I_s$ (1) to flow into the sense circuit and a binary "1" is indicated. When the $W_j$ word line read voltage is removed, the trap state of the device has not changed and the operation may be repeated indefinitely.

To write a new word in to the $W_j$ location of the memory plane, a clear pulse of 5 volts is applied to the $W_j$ line. All cells associated with the $W_j$ word are now high impedance, and all traps are essentially filled. To write a "one" (empty traps) into those desired cells of the $W_j$ word, a positive voltage either a ramp, as in FIG. 33, 2 volts for approximately 25 milli-sec. or a sharp pulse is applied to corresponding bit lines by the individual bit drivers. It is to be understood that the voltage across the selected cells must be sufficient to cause those cells to change their impedance state, but insufficient to disturb or cause a change of state of the non-selected cells. The net voltage across these selected cells is now 3 volts for 25 milli-sec. Traps associated with these cells now have time to empty and the negative resistance of curve 1 is now obtained. Removing the word line voltage of 5 volts in a time <10 milli-sec. will cause unselected cells to have filled traps ("0") and selected cells to have unfilled traps ("1"). The voltage (2 v.) may likewise be removed from the selected bit lines returning the memory plane once again to the "unpowered" mode. The two volts applied to cells associated with other word lines during this described operation will not disturb their information state. In the matrix of FIG. 32, all bit lines are tied to ground through low impedance sense amplifiers.

The present concept of the forming process is that the initial high electric fields in the insulator induce a mechanical stress which in turn gives rise to the necessary traps to form the device. Thus fabrication of an M-I-M device can be accomplished by either controlling the pressure or adding impurities during the evaporation of the insulator. This device would not have to be formed by a high electical field and should be more stable and reproducible. In addition, the noise found in the negative resistance and "high impedance" regions should be significantly decreased, since this noise appears to be related to the forming process at these high fields.

There are two ways of critically examining the forming process. One is to record the I–V curves for several cycles until the device is completely formed. From previous studies, the magnitude and shape of the initial I–V curve continually changes. The magnitude of the current is primarily determined by $J \approx Ae^{ds\sqrt{ao}}$ and the voltage dependence is related by $Ja$ sinh kv. where $$k=\frac{ds}{L\sqrt{ao}}$$

For all practical purposes $s \approx d$, where $d$ is the distance between tunnelling traps. From the expiremental I–V curves k and hence $d$ can be determined and any change in $d$ can be related to the forming process. The other explicit test of any change in the trap density due to the forming process may be detected by examination of the widths of the X-ray diffraction line profile. The $(hkl)$ lines for $M_gF_2$ of formed and unformed devices can be examined. The formed insulator should have broader line profiles due to additional imperfections, which induces a root mean square stress in the insulator.

The onset of the negative resistance region occurs when the electrons tunnel into the conduction band of the insulator. When the distance traveled is greater than the electronic mean free path, the majority of the electrons will be in thermal equilibrium with the lattice; thus, they will drop into the traps in the insulator. Then the experimental I–V curves of insulators of different thicknesses will deviate from the sinh kv. relation at different voltages. The thinner the insulator, the higher the voltage that the I–V characteristics remain sinh kv. It is also apparent that the electron emission from the thinner device should be greater than for a thicker device, since the electrons will have a higher kinetic energy.

There has thus been described, a new metal-insulator-metal M-I-M thin film structure which exhibits negative resistance, electron emission, and an unusual memory effect. This unusual combination of properties suggests a large number of important applications, including a non-destructive-read memory element requiring only pulse power during read or write operation. Under static conditions the memory retains information for long time intervals without electrical power. It also suggests a resistor-coupled threshold-type element different from the tunnel diode in that, the unit operating bistably draws two distance levels of current whereas the tunnel diode is essentially a constant current operating device. Also suggested are shift registers, scalers squaring and hybrid circuits. A flat display panel utilizing metal-insulator-metal cold electron emitters having "memory" or "hold" facilities can be fabricated in accordance with the foregoing description. These include alphameric read outs, small or large board displays etc.

The device is unique, not only possessing this range of potential applications but, so far as present knowledge would indicate, in being able to perform all or several of these functions simultaneously in a single application.

The M-I-M current peak to valley ratio is at least an order of magnitude greater than that of a tunnel diode. It is capable of remembering its information state when power is removed for long time intervals. The M-I-M voltages are compatable with conventional transistors and diodes. Tunnel diodes operate typically at a fraction of a volt requiring special components in the system, i.e. the backward diode. M-I-M devices truly simulate the "on-off" switch. Currents associated with the "high impedance" state of a tunnel diode are so high that bistable operation thereof is usually achieved in a constant current mode. Because of the larger voltage swings associated with the M-I-M circuits, signal to noise ratio is high, relaxing the tolerances of supporting circuits and the need for excessive precautions to reduce noise. The electron emission properties of M-I-M units occurring in the "high impedance" state provides the means for a visual read out of the state of the device. Since the M-I-M fabrication entails simple masking procedures and conventional thermal evaporation techniques, device fabrication technique coincide with the present practice in micro miniaturization and anticipated components densities of 108 components per square foot can readily be realized.

What is claimed is:

1. The method of fabricating thin film electron emissive apparatus comprising the steps of,
   (a) producing a thermally oxidized coating upon a layer of conductive material in vacuo,
   (b) depositing a metal-halogen layer upon said oxidized coating effective to provide electrical isolation between said last named layer and said oxidized layer,
   (c) depositing a layer of conductive material upon said metal-halogen layer,
   (d) providing means for applying electrical potentials to said conductive layers, and
   (e) applying a potential of from 0 v.–6 v. and back to 0 v. at a pressure ⩽15 microns of Hg to the conductive layers of said apparatus thereby forming said apparatus effective to induce quantum mechanical traps in the metal-halogen layer.

2. The method of fabricating thin film electron emissive apparatus comprising the steps of,
   (a) producing a thermally oxidized coating upon a layer of conductive material in vacuo,
   (b) depositing a layer of a metal-halogen upon said oxidized coating effective to provide electrical isolation between said last named layer and said oxidized layer,
   (c) depositing a layer of conductive material upon said metal-halogen layer,
   (d) providing means for applying electrical potentials to said conductive layers,
   (e) applying a potential of from 0 v.–6 v. and back to 0 v. at a pressure ⩽15 microns of Hg to said conductive layers thereby forming same apparatus effective to induce quantum mechanical traps in the metal-halogen layer, and
   (f) arranging a light emissive layer relative to said last named conductive layer forming a vacuum gap therebetween effective upon energization of said conductive layers to cause electron emission into said gap stimulating said light emission layer.

3. The method of fabricating thin film electron emissive apparatus comprising the steps of,
   (a) producing a thermally oxidized coating upon a layer of conductive metal material in an inert water vapor free atmosphere,
   (b) depositing a layer of a magnesium fluoride upon said oxidized coating effective to provide electrical isolation between said last named layer and said oxidized coating,
   (c) depositing a layer of conductive metal material upon said magnesium fluoride layer,
   (d) providing means for applying electrical potentials to said conductive layers, and
   (e) applying a potential of from 0 v.–6 v. and back to 0 v. at a pressure ⩽15 microns of Hg to said conductive layers thereby forming said apparatus effectively inducing quantum mechanical traps in the magnesium fluoride layer.

4. The method of fabricating thin film electron emissive apparatus comprising the steps of,
   (a) producing a thermally oxidized coating on the order of 20 A. thick in an oxygen atmosphere at a temperature of 100° C. upon a layer of conductive material from 500–5,000 A. thick in vacuo.
   (b) depsiting a layer of magnesium fluoride 200–3,000 A. thick upon said oxidized coating effective to provide electrical isolation between said last named layer and said oxidized layer,
   (c) depositing a layer of conductive material 100–5,000 A. thick upon said magnesium fluoride layer,
   (d) providing conductive means for applying electrical potentials to said conductive layers, and (e) applying a potential of from 0 v.–6 v. and back to 0 v., at a pressure ⩽15 microns of Hg to said conductive layers thereby forming said apparatus effective to induce quantum mechanical traps in the magnesium fluoride layer and resulting in the exhibition of negative resistance.

5. The method of fabricating thin film electron emissive apparatus comprising the steps of, (a) producing a thermally oxidized aluminum coating 20 A. thick upon a layer of conductive aluminum 2,000 A. thick in an inert atmosphere, (b) depositing a layer of magnesium fluoride 1,500 A. thick upon said oxidized coating effective to provide electrical isolation between said last named layer and said oxidized layer, (c) depositing a layer of conductive gold 1,500 A. thick upon said magnesium fluoride layer, (d) providing means for applying electrical potentials to said conductive layers, and (e) gradually applying a potential of from 0 v. to 6 v. and back to 0 v. at a pressure ⩽15 microns of Hg to said conductive layers effective to induce quantum mechanical traps in the magnesium fluoride layer.

6. Negative resistance thin film emissive apparatus comprising, (a) a layer of conductive material having an oxidized coating thereon, (b) a metal-halogen layer deposited upon said oxide layer, and (c) a layer of conductive material disposed upon said metal-halogen layer forming a metal-insulator-metal sandwich structure, means for applying a potential of from 0 v.–6 v. and back to 0 v. at a pressure ≦15 microns of Hg effectively forming said apparatus so as to induce quantum mechanical traps in the metal halogen layer thereby causing quantum mechanical electron tunneling as a result of said traps.

7. Negative resistance thin film emissive apparatus comprising, (a) a vacuum deposited layer of conductive material of the order of 2,000 angstroms in thickness and having a thermally oxidized coating of the order of 20 angstroms in thickness thereon, (b) a layer of magnesium fluoride, of the order of 1,500 angstroms in thickness deposited upon said oxidized coating, and (c) a vacuum deposited layer of conductive material disposed upon said magnesium fluoride layer approximately 1,000 angstroms in thickness forming a metal-insulator-metal sandwich, means for applying a potential of from 0 v.–6 v. and back to 0 v. at a pressure ≦15 microns of Hg effectively forming said apparatus so as to induce quantum mechanical traps in the metal-halogen layer thereby causing quantum mechanical electron tunneling as a result of said traps.

8. Negative resistance thin film emissive apparatus comprising, (a) an insulating substrate, (b) a vacuum deposited layer of conductive material of the order of 2,000 angstroms in thickness and having a thermally oxidized coating of the order of 20 angstroms in thickness thereon disposed upon said substrate, (c) a layer of lithium fluoride deposited upon said oxidized coating of the order of 1,500 angstroms in thickness, and (d) a vacuum deposited layer of conductive material disposed upon said lithium fluoride layer approximately 1,000 angstroms in thickness forming a metal-insulator-metal sandwich structure, means for applying a potential of from 0 v.–6 v. and back to 0 v. at a pressure ≦15 microns of Hg effectively forming said apparatus so as to induce quantum mechanical traps in the metal-halogen layer thereby causing quantum mechanical electron tunneling as a result of said traps.

9. Negative resistance thin film emissive apparatus comprising, (a) a substrate provided with a metal-insulator-metal quantum mechanical tunnel electron emitting device disposed in a vacuum environment, (b) a dielectric member disposed adjacent said tunnel emitting device and being provided with an aperture therein effective to provide a vacuum gap for transfer of electrons from said emitting device, (c) a display member overlying said dielectric member and including means responsive to the impingement of electrons thereon for emitting light therefrom, (d) a conductive material in contact with said light emitting layer and having means for applying an accelerating potential thereto, (e) a transparent member overlying said conductive layer, and (f) means for applying suitable electrical potentials to said apparatus effective to cause electron emission into said vacuum gap whereby said accelerating potential is effective to cause said light emitting member to luminesce.

10. Negative resistance thin film emissive apparatus comprising, (a) an insulating substrate provided with a plurality of metal-insulator-metal quantum mechanical tunnel electron emitting device, (b) a dielectric member disposed adjacent said tunnel emitting device and being provided with a plurality of apertures therein effective to provide vacuum gaps from transfer of electrons from said emitting device, (c) a display member overlying said dielectric member and including means repsonsive to the inpingement of electrons thereon for emitting light therefrom, (d) a conductive material in contact with said light emitting layer and having means for applying an eccelerating potential thereto, (e) a transparent member overlying said conductive layer, and (f) means for applying suitable electrical potentials to said emitting device effective to cause electron emission into said vacuum gaps whereby said accelerating potential is effective to cause said light emitting member to luminesce.

11. Negative resistance thin film emissive apparatus operable as a memory storage device capable of exhibiting a high or a low impedance comprising, (a) an insulating substrate, (b) a vacuum deposited layer of conductive material having a thermally oxidized coating of the order of 20 A. thickness thereon deposited upon said substrate, (c) a metal-halogen layer deposited upon said oxidized layer, (d) a vacuum deposited layer of conductive material disposed upon said metal-halogen layer forming a metal-insulator-metal sandwich structure, (e) means for applying a potential of from 0 v.–6 v. and back to 0 v. at a pressure ≦15 microns of Hg effectively forming said apparatus so as to induce quantum mechanical traps in the metal-halogen layer thereby causing quantum mechanical electron tunneling as a result of said traps thereby providing a metal-insulator-metal memory cell, and (f) circuit means applying a first level of voltage across said cell for storing a high impedance state and for lowering said voltage for at least a predetermined time period to a second level for storing a low impedance state whereby said cell remains in its stored impedance state when the applied potential is removed therefrom.

12. Negative resistance thin film emissive apparatus operable as a memory storage device capable of exhibiting a high or a low impedance comprising, (a) an insulating substrate,
(b) a vacuum deposited layer of conductive material of the order of 2000 A. in thickness and having a thermally oxidized coating of the order of 20 A. in thickness thereon deposited upon said substrate,
(c) a layer of magnesium fluoride deposited upon said oxidized coating of the order of 1500 A. in thickness,
(d) a vacuum deposited layer of conductive material disposed upon said magnesium fluoride layer approximately 1000 A. in thickness forming a metal-insulator-metal sandwich structure,
(e) means for applying a potential of from 0 v.–6 v. and back to 0 v. at a pressure ≦15 microns of Hg effectively forming said apparatus so as to induce quantum mechanical traps in the magnesium fluoride layer thereby causing quantum mechanical electron tunneling as a result of said traps thereby providing a metal-insulator-metal memory cell, and
(f) circuit means applying a first level of voltage across said cell for storing a high impedance state and for removing said voltage from across said cell at a volt per second rate exceeding a critical limit in order to cause said cell to retain its high impedance storage condition in the absence of an applied voltage.

13. Negative resistance thin film emissive apparatus operable as a memory storage device capable of exhibiting a high or a low impedance comprising, (a) an insulating substrate,
(b) a vacuum deposited layer of conductive material of the order of 2000 A. in thickness and having a thermally oxidized coating of the order of 20 A. in thickness thereon deposited upon said substrate,
(c) a layer of lithium fluoride deposited upon said oxidized coating of the order of 1500 A. in thickness,
(d) a vacuum deposited layer of conductive material disposed upon said lithium fluoride layer approximately 1000 A. in thickness forming a metal-insulator-metal sandwich structure,
(e) means for applying a potential of from 0 v.–6 v. and back to 0 v. at a pressure ≦15 microns of Hg effectively forming said apparatus so as to induce quantum mechanical traps in the lithium fluoride layer thereby causing quantum mechanical electron tunneling as a result of said traps thereby providing a metal-insulator-metal memory cell,
(f) circuit means non-destructively applying a first level of voltage, starting from an unpowered state, across said cell of no greater than a predetermined voltage for causing said cell to increase its current to a first or a second level depending upon its previously stored impedance condition, and
(g) means for sensing said current to determine the state of the memory cell.

14. Negative resistance thin film emissive apparatus operable as a memory storage device capable of exhibiting a high or a low impedance comprising, (a) an insulating substrate,
(b) a vacuum deposited layer of conductive material of the order of 2000 A. in thickness and having a thermally oxidized coating of the order of 20 A. in thickness thereon deposited upon said substrate,
(c) a layer of lithium fluoride deposited upon said oxidized coating of the order of 1500 A. in thickness,
(d) a vacuum deposited layer of conductive material disposed upon said lithium fluoride layer approximately 1000 A. in thickness forming a metal-insulator-metal sandwich structure,
(e) means for applying a potential of from 0 v.–6 v. and back to 0 v. at a pressure ≦15 microns of Hg effectively forming said apparatus so as to induce quantum mechanical traps in the lithium fluoride layer thereby causing quantum mechanical electron tunneling as a result of said traps thereby providing a metal-insulator-metal memory cell capable of exhibiting a high or a low impedance and having a negative resistance characteristic,
(f) a matrix of said metal-insulator-metal cells arranged in rows and columns,
(g) row and column conductors connected to individual groups of cells in said matrix,
(h) circuit means for applying a first level of voltage across a cell for storing a high impedance state and for removing said voltage from across said cell at a volt per second rate exceeding a critical limit in order to cause the cell to retain its high impedance storage condition in the absence of an applied voltage, and
(i) means for non-destructively sensing the stored condition of the cells by controlling the level of voltage applied to such cells and by sensing the current flow therethrough.

15. A memory apparatus as defined in claim 14 wherein said matrix defines a word organized memory including means for providing a voltage of a predetermined magnitude to a selected row and for simultaneously sensing the current flow through the respective cells of said selected rows along said column conductors.

16. A memory apparatus as defined in claim 14 wherein said matrix is arranged for random access operation having said row and column conductors connected to a common end of said individual cells through separate resistors and the opposite end of said cells connected to said means for sensing said cells.

17. Negative resistance thin film emissive apparatus operable as a memory storage device capable of exhibiting a high or a low impedance comprising, (a) an insulating substrate,
(b) a vacuum deposited layer of conductive material of the order of 2000 A. in thickness and having a thermally oxidized coating of the order of 20 A. in thickness thereon deposited upon said substrate,
(c) a layer of magnesium fluoride deposited upon said oxidized coating of the order of 1500 A. in thickness,
(d) a vacuum deposited layer of conductive material disposed upon said magnesium fluoride layer approximately 1000 A. in thickness forming a metal-insulator-metal sandwich structure,
(e) means for applying a potential of from 0 v.–6 v. and back to 0 v. at a pressure ≦15 microns of Hg effectively forming said apparatus so as to induce quantum mechanical traps in the magnesium fluoride layer thereby causing quantum mechanical electron tunneling as a result of said traps thereby providing a metal-insulator-metal memory cell having a negative resistance characteristic and being capable of retaining its stored impedance condition in an unpowered state,
(f) row and column conductors connected to individual groups of cells in a matrix,
(g) circuit means for applying a first level of voltage across a cell for storing a high impedance state and for removing said voltage from across said cell at a volt per second rate exceeding a critical limit in order to cause said cell to retain its high impedance storage condition in said unpowered state, and
(h) means for causing a cell connected to a word row conductor to acquire the desired impedance condition by altering the voltage levels applied to the selected row and a selected column conductor by an amount on each which is insufficient by itself to change the impedance of the cell but the combination of which causes the cell to acquire the desired impedance condition and to maintain such impedance condition when said first and second voltage levels are reestablished.

18. A word organized matrix of metal-insulator-metal cells as defined in claim 17 including a visual display member overlying the cells of said matrix for emitting light from only those cells adjacent thereto which are maintained in a high impedance condition.

19. Negative resistance thin film emissive apparatus operable as a memory storage device capable of exhibiting a high or a low impedance comprising, (a) an insulating substrate, (b) a vacuum deposited layer of conductive material of the order of 2000 A. in thickness and having a thermally oxidized coating of the order of 20 A. in thickness thereon deposited upon said substrate, (c) a layer of a metal halogen deposited upon said oxidized coating of the order of 1500 A. in thickness, (d) a vacuum deposited layer of conductive material disposed upon said metal halogen layer approximately 1000 A. in thickness forming a metal-insulator-metal cell having a negative resistance characteristic, (e) means for applying a potential of from 0 v.–6 v. and back to 0 v. at a pressure $\leqq$15 microns of Hg effectively forming said cell so as to induce quantum mechanical traps in the metal halogen layer so as to cause quantum mechanical electron tunneling as a result of said traps, (f) circuit means applying a first level of voltage across said cell for storing a high impedance state and for removing said voltage from across said cell at a volt per second rate exceeding a critical limit thereby to cause the cell to retain its high impedance storage condition in the absence of applied voltage, (g) a substantially constant current source connected across said cell operating the circuit in its bistable mode of operation, (h) at least one triggering circuit connected to said cell for switching it to the desired high or low impedance state, and (i) an output load circuit for sensing the change in current drawn by said cell.

References Cited

UNITED STATES PATENTS

| | | | |
|---|---|---|---|
| 3,134,963 | 5/1964 | Henle et al. | 340—173 |
| 3,149,311 | 9/1964 | Hyman et al. | 340—173 |
| 3,257,581 | 6/1966 | Lodge et al. | 313—108 |
| 3,267,317 | 8/1966 | Fisher | 317—234 |

OTHER REFERENCES

Amodei, Juan J. et al.: "Nondestructive Tunnel Diode Memory Cell" RCA TN No. 468, September 1961—5 pp.

BERNARD KONICK, *Primary Examiner.*

J. F. BREIMAYER, *Assistant Examiner.*

UNITED STATES PATENT OFFICE

CERTIFICATE OF CORRECTION

Patent No. 3,363,240 January 9, 1968

Rudolph A. Cola et al.

It is hereby certified that error appears in the above numbered patent requiring correction and that the said Letters Patent should read as corrected below.

Column 1, line 21, after "Quantum" insert -- mechanical --; line 32, for "tin" read -- thin --; column 3, line 62, for "or" read -- of --; column 4, line 46, for "a" read -- at --; column 7, lines 55 and 56, for the first character of the equation reading "$\varphi$" read -- $\overline{\varphi}$ --; column 10, line 16, for "ont" read -- on --; line 25, for "said" read -- some --; column 14, line 3, after "large" insert -- power --; column 14, line 54, for "$B_B$" read -- $V_B$ --; column 15, line 67, for "68" read -- 78 --; column 16, line 12, for "analog" read -- analogy --; line 25, for "$X_iY_j$", first occurrence, read -- $X_1Y_j$ --; column 17, line 44, for "distance" read -- distinct --; column 18, line 1, for "technique" read -- techniques --; line 3, for "108" read -- $10^8$ --; lines 8, 25 and 67, for "vacuo", each occurrence, read -- vacua --; line 36, for "same" read -- said --; line 43, for "emission" read -- emissive --; same column 18, line 72, for "100-" read -- 10- --; column 20, line 36, for "inpinge-" read -- impinge- --; line 41, for "eccelerating" read -- accelerating --.

Signed and sealed this 11th day of March 1969.

(SEAL)
Attest:

EDWARD M.FLETCHER,JR.
Attesting Officer

EDWARD J. BRENNER
Commissioner of Patents